US010670915B2

(12) United States Patent
Suzuki et al.

(10) Patent No.: US 10,670,915 B2
(45) Date of Patent: Jun. 2, 2020

(54) DISPLAY DEVICE AND DIMMING DEVICE

(71) Applicant: Japan Display Inc., Tokyo (JP)

(72) Inventors: Daichi Suzuki, Tokyo (JP); Kazuhiko Sako, Tokyo (JP)

(73) Assignee: Japan Display Inc., Tokyo (JP)

( * ) Notice: Subject to any disclaimer, the term of this patent is extended or adjusted under 35 U.S.C. 154(b) by 151 days.

(21) Appl. No.: 15/892,001

(22) Filed: Feb. 8, 2018

(65) Prior Publication Data

US 2018/0231836 A1 Aug. 16, 2018

(30) Foreign Application Priority Data

Feb. 10, 2017 (JP) ................................ 2017-023398

(51) Int. Cl.

| | |
|---|---|
| ***G09G 3/36*** | (2006.01) |
| ***G02F 1/1335*** | (2006.01) |
| ***G02F 1/13357*** | (2006.01) |
| ***G02F 1/1343*** | (2006.01) |
| ***G02F 1/1347*** | (2006.01) |
| ***H05B 45/10*** | (2020.01) |

(52) U.S. Cl.

CPC ...... *G02F 1/133602* (2013.01); *G02F 1/1336* (2013.01); *G02F 1/1343* (2013.01); *G02F 1/13471* (2013.01); *G09G 3/36* (2013.01); *G09G 3/3648* (2013.01); *H05B 45/10* (2020.01); *G02F 2001/133601* (2013.01); *G09G 2300/023* (2013.01); *G09G 2300/0452* (2013.01); *G09G 2360/16* (2013.01)

(58) Field of Classification Search

CPC combination set(s) only.
See application file for complete search history.

(56) References Cited

U.S. PATENT DOCUMENTS

| | | | | |
|---|---|---|---|---|
| 4,958,912 A * | 9/1990 | Inaba | ................. | G06K 15/1252 345/97 |
| 6,144,374 A * | 11/2000 | Hyun | ....................... | G09G 3/22 323/273 |
| 2012/0176373 A1* | 7/2012 | Haga | .................... | H04N 13/324 345/419 |
| 2012/0293566 A1* | 11/2012 | Uchida | ................ | G09G 3/3611 345/690 |

(Continued)

FOREIGN PATENT DOCUMENTS

JP 2013-161053 A 8/2013

*Primary Examiner* — Chanh D Nguyen
*Assistant Examiner* — Nguyen H Truong
(74) *Attorney, Agent, or Firm* — K&L Gates LLP

(57) ABSTRACT

According to an aspect, a display device includes: a display panel including a display area with pixels; a backlight; and a dimmer. The dimmer includes a dimming panel including a dimming area overlapping the display area and a control circuit. The dimming area includes a plurality of regions each including a first electrode and a second electrode. The control circuit includes a shift register configured to receive an electrical signal for controlling a potential of each of the first electrodes and including a plurality of sequential circuits coupled in series, a holding circuit to which an output of each of the sequential circuits is coupled, and a gradation voltage setter to which an output of the holding circuit is coupled. Each of the first electrodes is coupled to an output of the gradation voltage setter.

16 Claims, 15 Drawing Sheets

(56) References Cited

U.S. PATENT DOCUMENTS

2015/0226988 A1* 8/2015 Chen .................... G02F 1/1334
349/12
2016/0091725 A1* 3/2016 Kim .................. G02B 27/2264
348/53
2019/0227309 A1* 7/2019 Kadono ............ G02B 27/0101

* cited by examiner

2
CONTROL DEVICE
1
IP
10
SIGNAL PROCESSOR
OP
BL
IMAGE DISPLAY PANEL DRIVER
40
20
SIGNAL OUTPUT CIRCUIT
41
SCANNING CIRCUIT
DTL
48
48
48
48
OA
42
SCL
30
70
CONTROL CIRCUIT
90
DI
DA
80
50
LA

DA
y4
y3
y2
y1
x9
x8
x7
x6
x5
x4
x3
x2
x1
LD
86
90
70
80
80a
80b
81
OE
CLK
DATA
DI
X
Y
Z 90
91
92
93
80
93a
DATA
CLK
OE
F1₁
F1₂
F1₃
F1₄
F1₅
F1₆
F2₁
F2₂
F2₃
F2₄
F2₅
F2₆
D
Q
C
SW1
SW2
SW3
SW4
FRP
xFRP
FRP2
FRP3
81
82
86
(N)
(N-1)
(N-2)
94
POTENTIAL GENERATOR

FIG.11
| 2-BIT SIGNAL | | POTENTIAL OF FIRST ELECTRODE |
| --- | --- | --- |
| FIRST STAGE | SECOND STAGE | |
| H | H | FRP |
| H | L | xFRP |
| L | H | FRP2 |
| L | L | FRP3 |
FIG.12
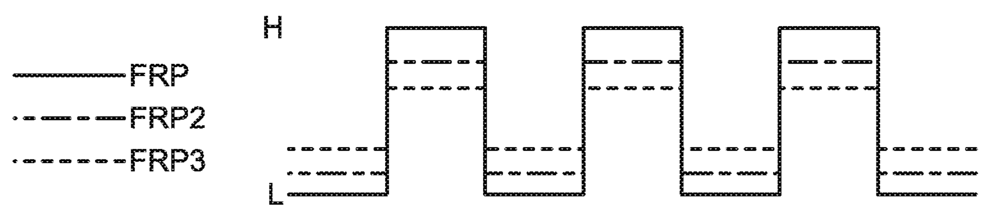
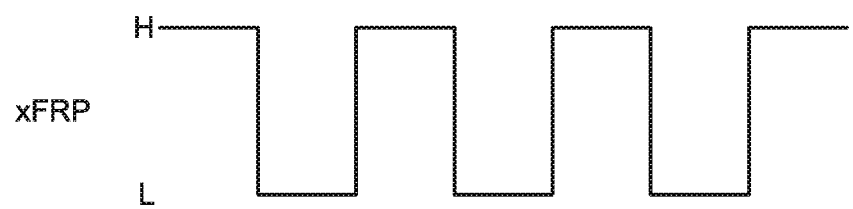

81
81a
86a
86b
90a
90b
x1
x2
x3
x4
x5
x6
x7
x8
x9
y1
y2
y3
y4
X
Y
Z

DISPLAY DEVICE AND DIMMING DEVICE

CROSS-REFERENCE TO RELATED APPLICATIONS

This application claims priority from Japanese Application No. 2017-023398, filed on Feb. 10, 2017, the contents of which are incorporated by reference herein in its entirety.

BACKGROUND

1. Technical Field

The present invention relates to a display device and a dimming device.

2. Description of the Related Art

As described, for example, in Japanese Patent Application Laid-open Publication No. 2013-161053, liquid crystal display devices are known that have a local dimming function to perform drive control of a backlight so as to vary the intensity of light emitted from the backlight according to luminance required for an image to be displayed.

SUMMARY

According to an aspect, a display device includes: a display panel including a display area provided with a plurality of pixels; a backlight configured to illuminate the display area of the display panel from a back surface thereof; and a dimmer configured to adjust a light quantity output from the backlight through the display area. The dimmer includes a dimming panel including a dimming area that is disposed in a position overlapping the display area when the display area is viewed in a plan view, and that is provided so as to be variable in transmittance of light, and a control circuit configured to control the transmittance. The dimming area includes a plurality of regions. Each of the regions includes a first electrode, and a second electrode provided in a position facing the first electrode across a liquid crystal layer. The control circuit includes a shift register configured to receive an electrical signal for controlling a potential of each of the first electrodes and including a plurality of sequential circuits coupled in series, a holding circuit to which an output of each of the sequential circuits is coupled, and a gradation voltage setter to which an output of the holding circuit is coupled. Each of the first electrodes is coupled to an output of the gradation voltage setter.

According to another aspect, a display device includes: a dimming panel including a dimming area provided so as to be variable in transmittance of light; and a control circuit configured to control the transmittance. The dimming area includes a plurality of regions. Each of the regions includes a first electrode, and a second electrode provided in a position facing the first electrode across a liquid crystal layer. The control circuit includes a shift register configured to receive an electrical signal for controlling a potential of each of the first electrodes, and a holding circuit configured to hold the electrical signal output from the shift register until a time to control the potential.

According to another aspect, a dimming device includes: a display panel including a display area provided with a plurality of pixels; a backlight configured to illuminate the display area of the display panel from a back surface thereof; and a dimmer configured to adjust a light quantity output from the backlight through the display area. The dimmer includes a dimming panel including a dimming area that is disposed in a position overlapping the display area when the display area is viewed in a plan view, and that is provided so as to be variable in transmittance of light, and a control circuit configured to control the transmittance. The dimming area includes a plurality of regions. Each of the regions includes a first electrode, and a second electrode provided in a position facing the first electrode across a liquid crystal layer. The control circuit includes a shift register configured to receive an electrical signal for controlling a potential of each of the first electrodes and including a plurality of sequential circuits coupled in series, a holding circuit to which an output of each of the sequential circuits is coupled, and a gradation voltage setter to which an output of the holding circuit is coupled. Each of the first electrodes is coupled to an output of the gradation voltage setter.

According to another aspect, a dimming device includes: a dimming panel including a dimming area provided so as to be variable in transmittance of light; and a control circuit configured to control the transmittance. The dimming area includes a plurality of regions. Each of the regions includes a first electrode, and a second electrode provided in a position facing the first electrode across a liquid crystal layer. The control circuit includes a shift register configured to receive an electrical signal for controlling a potential of each of the first electrodes, and a holding circuit configured to hold the electrical signal output from the shift register until a time to control the potential.

BRIEF DESCRIPTION OF THE DRAWINGS

FIG. 11 is a table illustrating exemplary correspondence relations each between a set of two 1-bit signals constituting a 2-bit signal for controlling a potential of one first electrode and the potential of the first electrode;

FIG. 12 is a diagram illustrating an exemplary relation between the potential of the first electrode and that of a second electrode;

DETAILED DESCRIPTION

Figure 1:
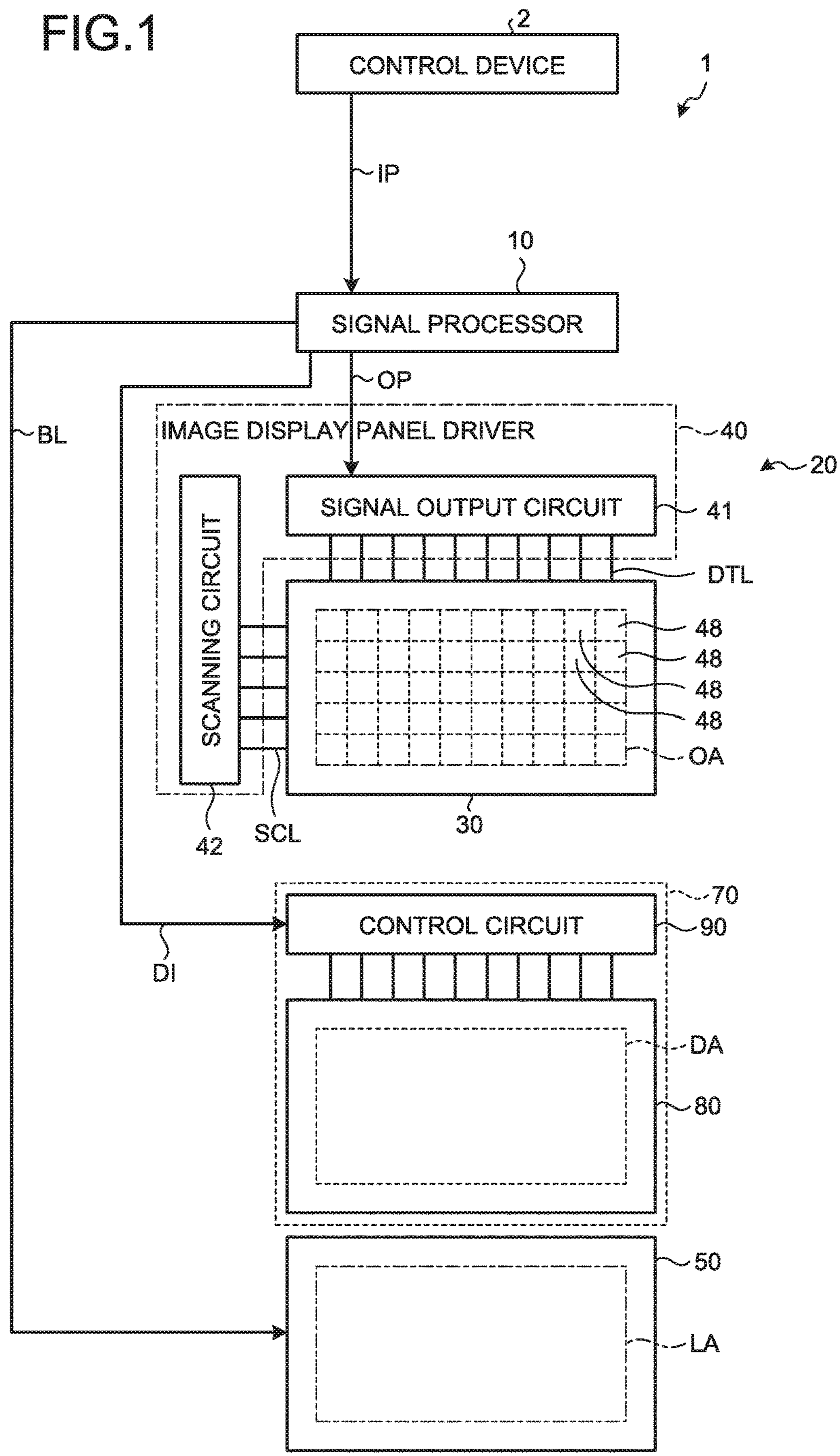
FIG. 1 is a diagram illustrating an exemplary main configuration of a display device according to a first embodiment of the present invention.

Conventional drive control of a backlight does not limit a range of reach of light from a light source included in the backlight. This sometimes generates a range supplied with unnecessary light.

For the foregoing reasons, there is a need for a display device and a dimming device that are capable of more accurately performing local dimming.

The following describes embodiments of the present invention with reference to the drawings. What is disclosed herein is merely an example, and the present invention naturally encompasses appropriate modifications easily conceivable by those skilled in the art while maintaining the gist of the invention. To further clarify the description, widths, thicknesses, shapes, and the like of various parts are schematically illustrated in the drawings as compared with actual aspects thereof, in some cases. However, they are merely examples, and interpretation of the present invention is not limited thereto. The same element as that illustrated in a drawing that has already been discussed is denoted by the same reference numeral through the description and the drawings, and detailed description thereof will not be repeated in some cases where appropriate.

In this disclosure, when an element is described as being “on” another element, the element can be directly on the other element, or there can be one or more elements between the element and the other element.

First Embodiment

FIG. 1 is a diagram illustrating an exemplary main configuration of a display device 1 according to a first embodiment of the present invention. The display device 1 of the first embodiment includes a signal processor 10, a display unit 20, a light source device 50, and a dimmer 70. The signal processor 10 performs various output operations based on an input signal IP received from an external control device 2. The input signal IP is a signal serving as data for displaying an image on the display device 1, and is, for example, a red-green-blue (RGB) image signal. The signal processor 10 outputs an output image signal OP generated based on the input signal IP to the display unit 20. The signal processor 10 outputs a local dimming signal DI generated based on the input signal IP to the dimmer 70. After receiving the input signal IP, the signal processor 10 outputs a light source drive signal BL for operating the light source device 50 to the light source device 50.

Figure 2:
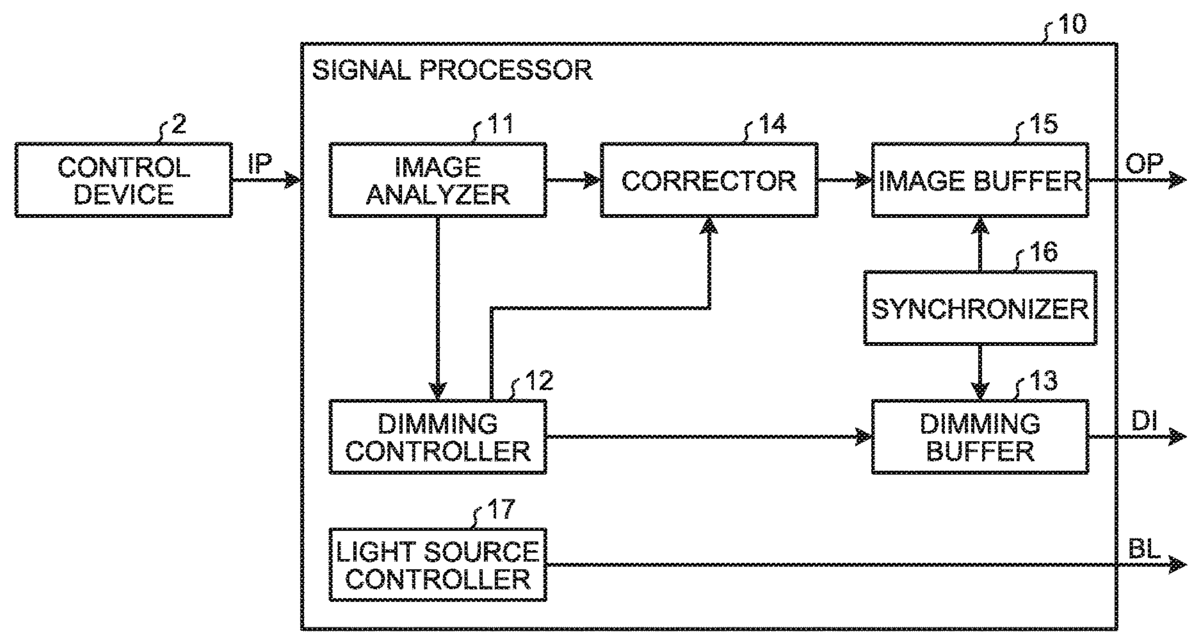
FIG. 2 is a block diagram illustrating an exemplary functional configuration of a signal processor.

FIG. 2 is a block diagram illustrating an exemplary functional configuration of the signal processor 10. The signal processor 10 is an integrated circuit, such as a field-programmable gate array (FPGA). The signal processor 10 includes, for example, an image analyzer 11, a dimming controller 12, a dimming buffer 13, a corrector 14, an image buffer 15, a synchronizer 16, and a light source controller 17. Based on the input signal IP, the signal processor 10 performs various types of processing according to the above-described functions implemented in the integrated circuit.

The display unit 20 includes an image display panel 30 and an image display panel driver 40. The image display panel 30 includes a display area OA provided with a plurality of pixels 48. The pixels 48 are arranged, for example, in a matrix (row-column configuration). The image display panel 30 of the first embodiment is a liquid crystal image display panel. The image display panel driver 40 includes a signal output circuit 41 and a scanning circuit 42. The signal output circuit 41 drives the pixels 48 according to the output image signal OP. The scanning circuit 42 outputs a drive signal for scanning the pixels 48 arranged in a matrix (row-column configuration) on a per predetermined number of rows basis (such as on a per row basis). Each of the pixels 48 is driven so as to output gradation values corresponding to the output image signal OP at the time when the drive signal is output.

The dimmer 70 adjusts a quantity of light emitted from the light source device 50 and output through the display area OA. The dimmer 70 includes a dimming panel 80 and a control circuit 90. The dimming panel 80 includes a dimming area DA. The dimming area DA is disposed in a position overlapping the display area OA when the display area OA is viewed in a plan view, and is provided so as to be able to vary the transmittance of light. The control circuit 90 controls the light transmittance of the dimming area DA.

Figure 3:
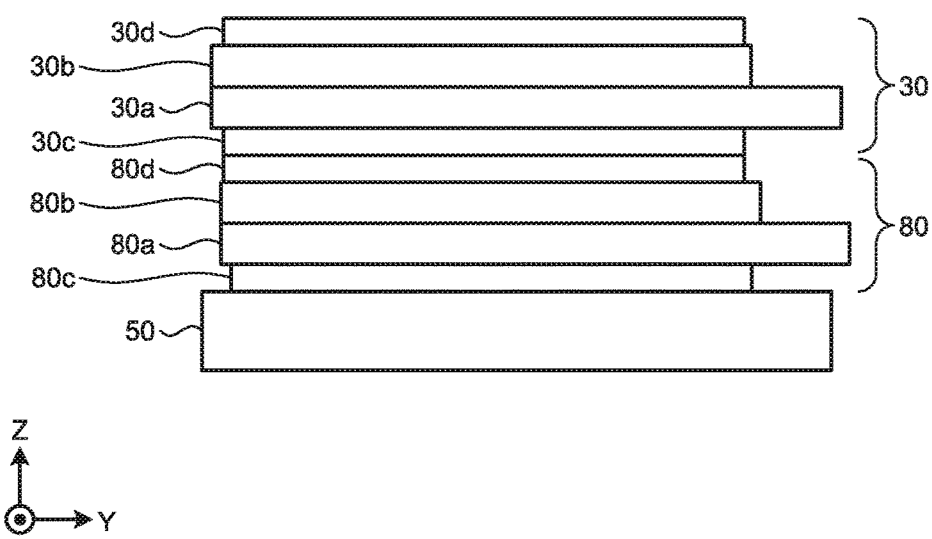
FIG. 3 is a diagram illustrating an exemplary positional relation of an image display panel, a dimming panel, and a light source device.

FIG. 3 is a diagram illustrating an exemplary positional relation of the image display panel 30, the dimming panel 80, and the light source device 50. In the first embodiment, as illustrated in FIG. 3, the image display panel 30, the dimming panel 80, and the light source device 50 are layered. Specifically, the dimming panel 80 is layered on a light emitting surface side of the light source device 50 from which the light is emitted. The image display panel 30 is layered on a side opposite to the light source device 50 across the dimming panel 80. The light emitted from the light source device 50 is adjusted in light quantity in the dimming area DA of the dimming panel 80, and illuminates the image display panel 30. The image display panel 30 is illuminated from a back surface side thereof where the light source device 50 is arranged, and outputs the image onto a side (display surface side) opposite to the back surface side. In this manner, the light source device 50 serves as a backlight for illuminating the display area OA of the image display panel 30 from the back surface thereof. In the first embodiment, the dimming panel 80 is located between the image display panel 30 and the light source device 50. Hereinafter, the Z-direction refers to the direction in which the image display panel 30, the dimming panel 80, and the light source device 50 are layered. The X-direction and the Y-direction refer to two directions orthogonal to the Z-direction. The X-direction and the Y-direction are orthogonal to each other. The pixels 48 are arranged in a matrix (row-column configuration) along the X- and Y-directions.

The image display panel 30 includes an array substrate **30*a* and a counter substrate 30*b* that is located on a display surface side of the array substrate 30*a* and faces the array substrate 30*a*. As will be described later, a liquid crystal layer LC1 is disposed between the array substrate 30*a* and the counter substrate 30***b* (refer to FIG. 5). A polarizing plate 30*c* is provided on a back surface side of the array substrate 30*a*. A polarizing plate 30*d* is provided on a display surface side of the counter substrate 30*b*. The dimming panel 80 includes a first substrate 80*a* and a second substrate 80*b* that is located on a display surface side of the first substrate 80*a* and faces the first substrate 80*a*. As will be described later, a liquid crystal layer LC2 is disposed between the first substrate 80*a* and the second substrate 80*b* (refer to FIG. 9). A polarizing plate 80*c* is provided on a back surface side of the first substrate 80*a*. A polarizing plate 80*d* is provided on a display surface side of the second substrate 80*b*.

Figure 4:
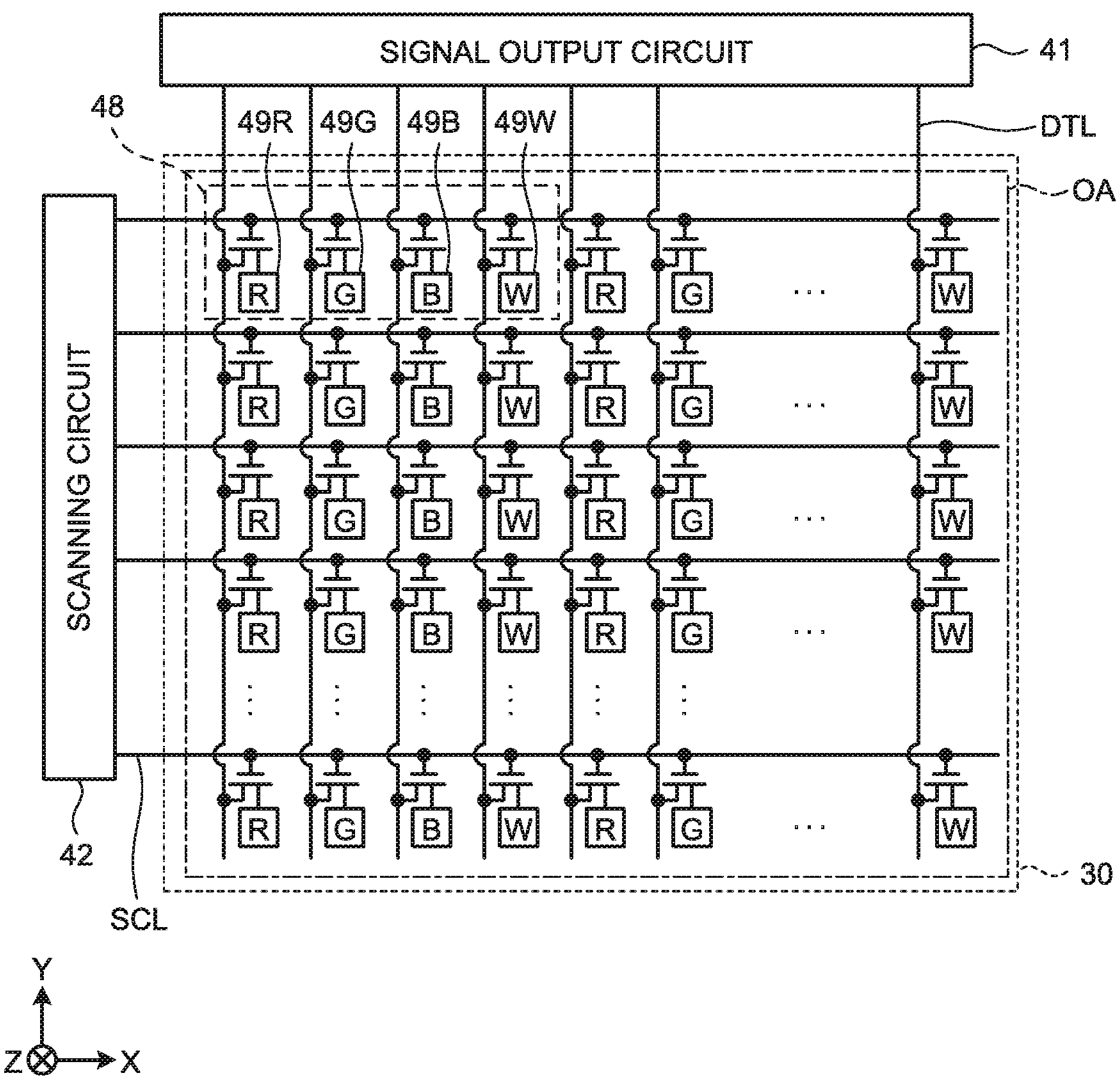
FIG. 4 is a diagram illustrating an exemplary pixel array of the image display panel.

FIG. 4 is a diagram illustrating an exemplary pixel array of the image display panel 30. As illustrated in FIG. 4, each of the pixels 48 includes, for example, a first sub-pixel 49R, a second sub-pixel 49G, a third sub-pixel 49B, and a fourth sub-pixel 49W. The first sub-pixel 49R displays a first primary color (for example, red). The second sub-pixel 49G displays a second primary color (for example, green). The third sub-pixel 49B displays a third primary color (for example, blue). The fourth sub-pixel 49W displays a fourth color (specifically, white). In this manner, each of the pixels 48 arranged in a matrix (in a row-column configuration) in the image display panel 30 includes the first sub-pixel 49R that displays a first color, the second sub-pixel 49G that displays a second color, the third sub-pixel 49B that displays a third color, and the fourth sub-pixel 49W that displays a fourth color. The first color, the second color, the third color, and the fourth color are not limited to the first primary color, the second primary color, the third primary color, and white, but only need to be different colors from one another, such as complementary colors. The fourth sub-pixel 49W that displays the fourth color is preferably brighter than the first sub-pixel 49R that displays the first color, the second sub-pixel 49G that displays the second color, and the third sub-pixel 49B that displays the third color, when irradiated with the same light source lighting amount. In the following description, the first sub-pixel 49R, the second sub-pixel 49G, the third sub-pixel 49B, and the fourth sub-pixel 49W will be each called a sub-pixel 49 when not being required to be distinguished from one another.

The display device 1 is more specifically a transmissive color liquid crystal display device. As illustrated in FIG. 4, the image display panel 30 is a color liquid crystal display panel, in which a first color filter for transmitting the first primary color is disposed between the first sub-pixel 49R and an image viewer, a second color filter for transmitting the second primary color is disposed between the second sub-pixel 49G and the image viewer, and a third color filter for transmitting the third primary color is disposed between the third sub-pixel 49B and the image viewer. The image display panel 30 has no color filter disposed between the fourth sub-pixel 49W and the image viewer. In this case, a large gap is formed on the fourth sub-pixel 49W. To address this, a transparent resin layer instead of the color filter may be provided on the fourth sub-pixel 49W. This can restrain the large gap from being formed on the fourth sub-pixel 49W.

The signal output circuit 41 is electrically coupled to the image display panel 30 through signal lines DTL. The image display panel driver 40 uses the scanning circuit 42 to select the sub-pixel 49 in the image display panel 30 and to control ON and OFF of a switching element (such as a thin-film transistor (TFT)) for controlling operations (light transmittance) of the sub-pixel 49. The scanning circuit 42 is electrically coupled to the image display panel 30 through scanning lines SCL. In the first embodiment, the scanning lines SCL extend along the X-direction, and the signal lines DTL extend along the Y-direction. These are, however, mere examples of extension directions of the scanning lines SCL and the signal lines DTL. The extension directions are not limited thereto, and can be changed as appropriate.

Figure 5:
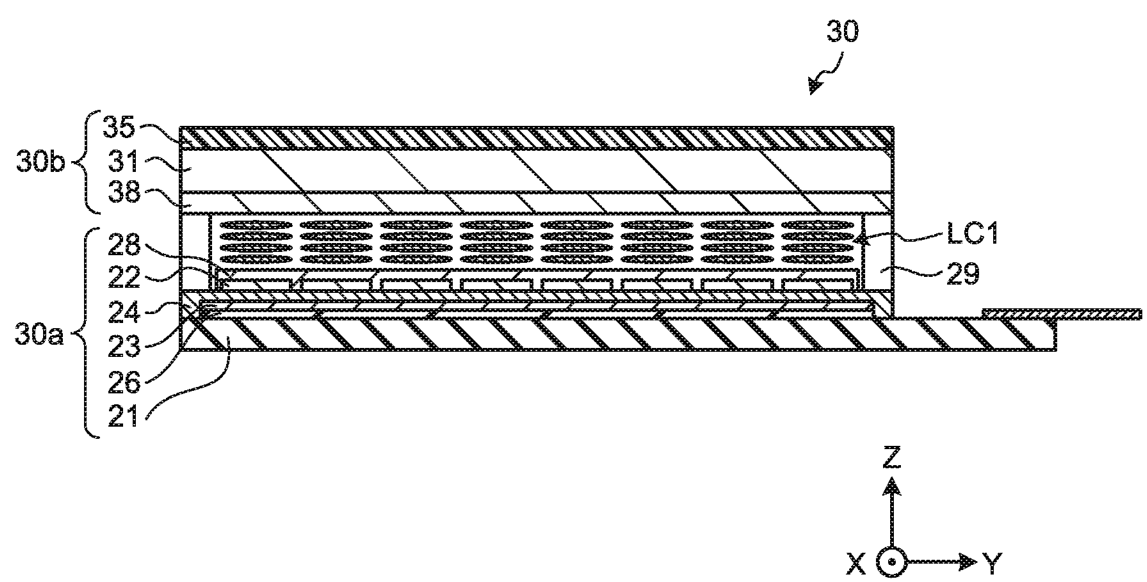
FIG. 5 is a sectional view of an exemplary schematic structure of the image display panel.

FIG. 5 is a sectional view of an exemplary schematic structure of the image display panel 30. The array substrate 30*a* includes a filter film 26, a counter electrode 23, an insulating film 24, and a first orientation film 28. The filter film 26 is provided on the upper side of a pixel substrate 21, such as a glass substrate. The counter electrode 23 is provided on the upper side of the filter film 26. The insulating film 24 is provided on the counter electrode 23 so as to be in contact therewith. The pixel electrodes 22 are provided on the upper side of the insulating film 24. The first orientation film 28 is provided on the uppermost surface side of the array substrate 30*a*. The counter substrate 30*b* includes a counter pixel substrate 31, such as a glass substrate, a second orientation film 38 provided on a lower surface of the counter pixel substrate 31, and a polarizing plate 35 provided on an upper surface of the counter pixel substrate 31. The array substrate 30*a* is fixed to the counter substrate 30*b* with a sealing part 29 interposed therebetween. The liquid crystal layer LC1 is sealed in a space surrounded by the array substrate 30*a*, the counter substrate 30*b*, and the sealing part 29. The liquid crystal layer LC1 contains liquid crystal molecules that change in alignment direction according to an electric field applied thereto. The liquid crystal layer LC1 modulates light passing through the liquid crystal layer LC1 according to the state of the electric field. The electric field applied between the pixel electrodes 22 and the counter electrode 23 changes the orientation of the liquid crystal molecules of the liquid crystal layer LC1, and thus changes the transmission amount of the light passing through the liquid crystal layer LC1. Each of the sub-pixels 49 includes the pixel electrode 22. The switching elements for individually controlling the operations (light transmittance) of the sub-pixels 49 are electrically coupled to the pixel electrodes 22.

Figure 6:
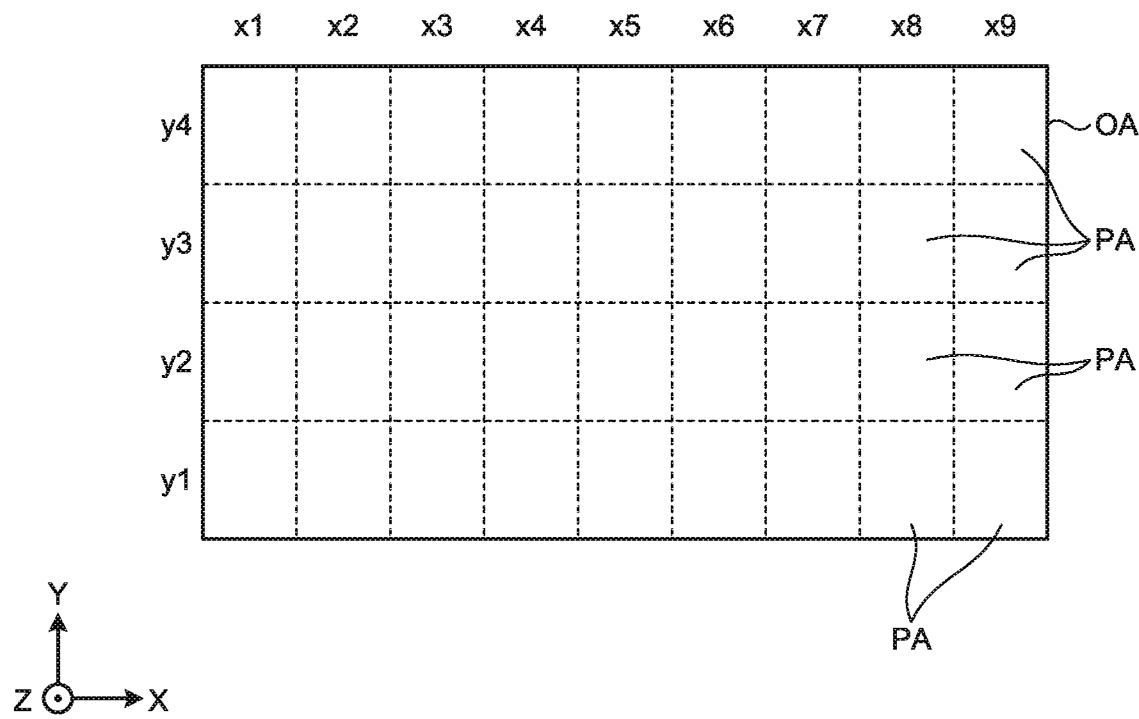
FIG. 6 is a diagram illustrating an exemplary relation between a display area and display segment regions.

FIG. 6 is a diagram illustrating an exemplary relation between the display area OA and display segment regions. The display area OA includes a plurality of display segment regions PA. An area including all the display segment regions PA serves as the display area OA. The display area OA illustrated in FIG. 6 includes the display segment regions PA individually provided in positions corresponding to 36 respective coordinate points. The 36 coordinate points correspond to combinations of coordinates x1, x2, . . . , and x9 set along the X-direction and coordinates y1, y2, y3, and y4 set along the Y-direction. The number and arrangement of the display segment regions PA included in the display area OA correspond to the number and arrangement of first electrodes 81 included in the dimming panel 80 (to be described later). One or more of the pixels 48 are disposed in each of the display segment regions PA.

Figure 7:
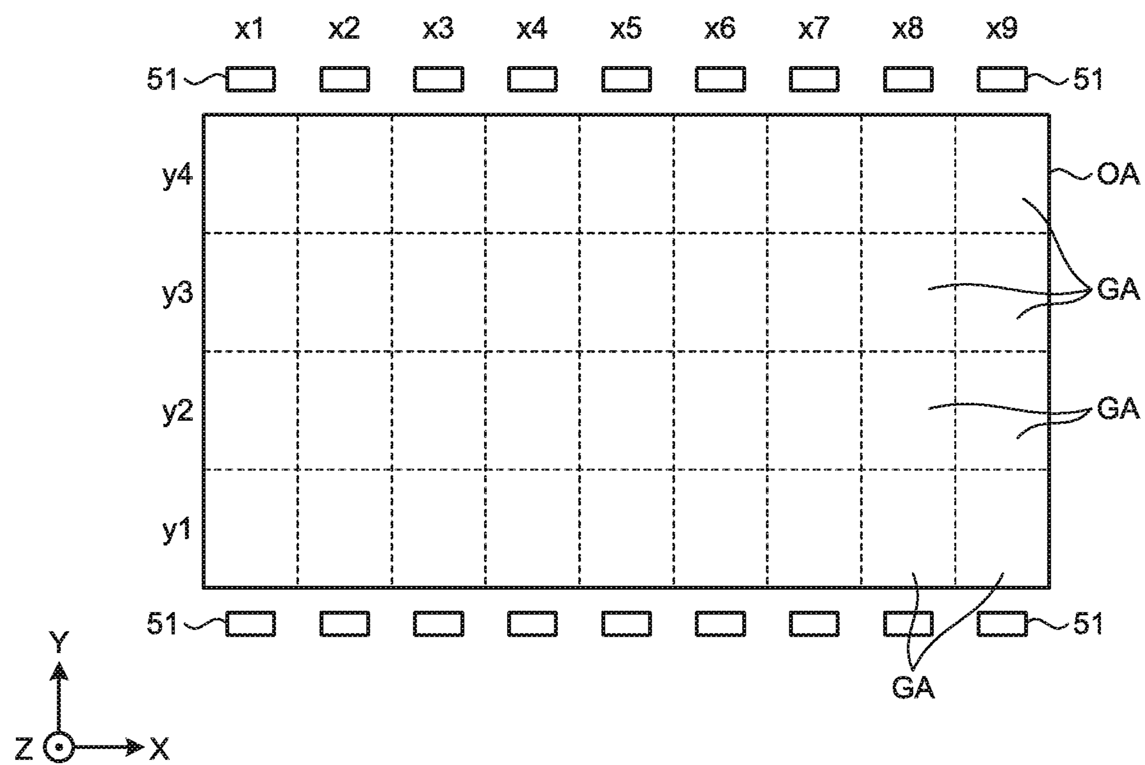
FIG. 7 is a diagram illustrating an exemplary main configuration of the light source device.

FIG. 7 is a diagram illustrating an exemplary main configuration of the light source device 50. The light source device 50 includes side lights located on lateral sides of the display area OA when the display area OA is viewed in the plan view. In the example illustrated in FIG. 7, a plurality of light sources 51 arranged along the X-direction on both sides in the Y-direction are provided with respect to a light guide plate LA provided in a position corresponding to the display area OA in an X-Y plan view. The light sources 51 are, for example, light-emitting diodes (LEDs) for emitting white light, but are not limited thereto, and can be changed as appropriate. Light from the light sources 51 is guided by the light guide plate LA, and illuminates the entire display area OA from a back surface side thereof. In FIG. 7, 9 light sources 51 are arranged in a line along the X-direction on each of one end side and the other end side in the Y-direction, and thus, a total of 18 light sources 51 are arranged. This is, however, a mere example of the number and arrangement of the light sources 51, which are not limited to this example, and can be changed as appropriate. For example, the light source device 50 may be a direct-lit backlight that includes light sources such as LEDs provided directly below the display area OA when viewed in the plan view.

In order to illustrate a correspondence relation between the light guide plate LA and the display area OA, FIG. 7 schematically illustrates a plurality of light source regions GA corresponding to the respective sets of coordinates of the display segment regions PA. When the light sources 51 are lit up, the light guide plate LA guides the light. As a result, each of the light source regions GA emits light having substantially the same light quantity from a back surface side of the display segment region PA corresponding to the position of the light source region GA. That is, the light source device 50 of the first embodiment emits the light at a predetermined output without controlling the light quantity of each display segment region PA to be a light quantity required for the the display segment region PA. The dimmer 70 has the function for controlling the light quantity of each display segment region PA to be the light quantity required for the display segment region PA.

Figure 8:
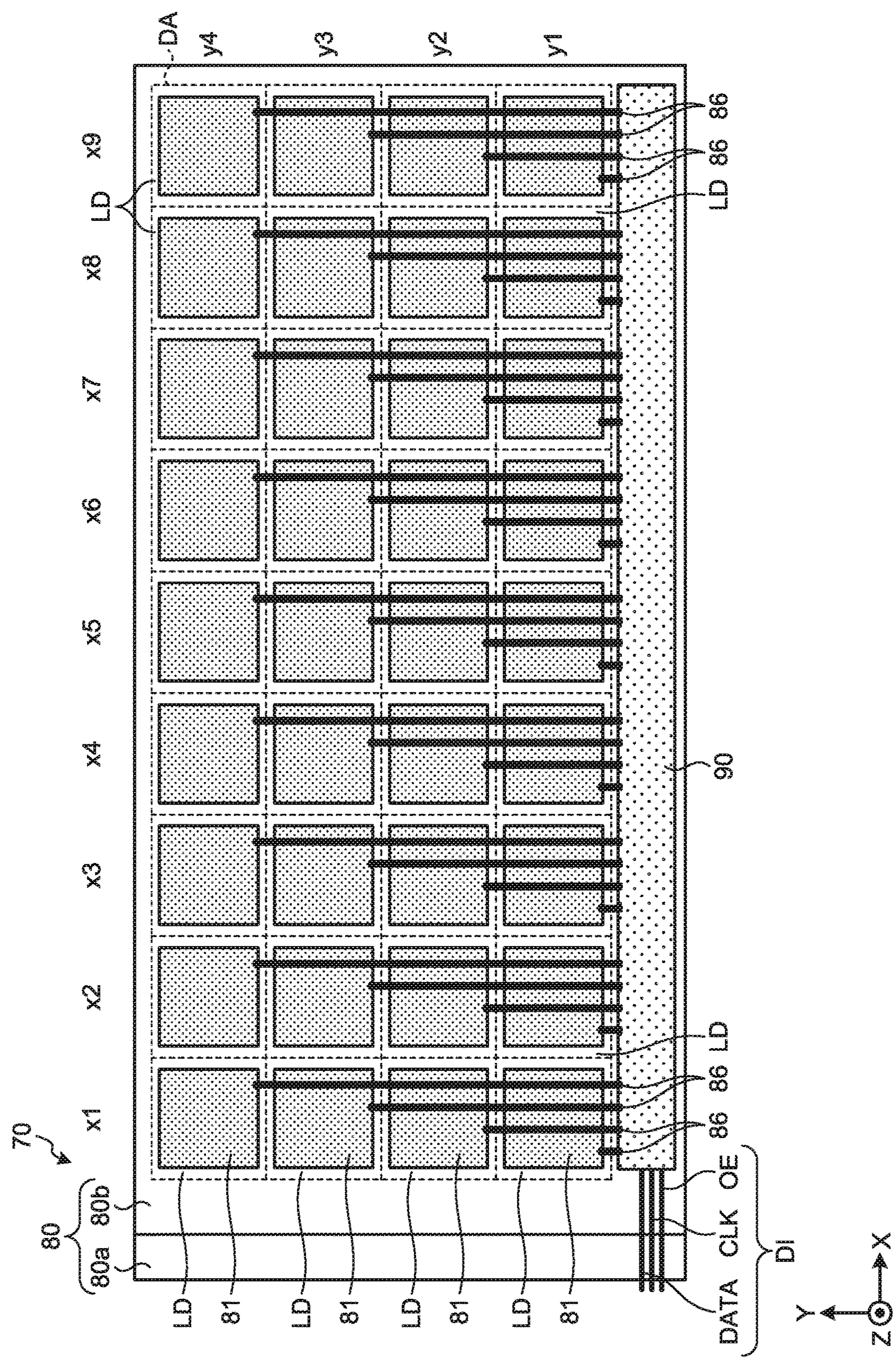
FIG. 8 is a diagram illustrating an exemplary main configuration of a dimmer.
Figure 9:
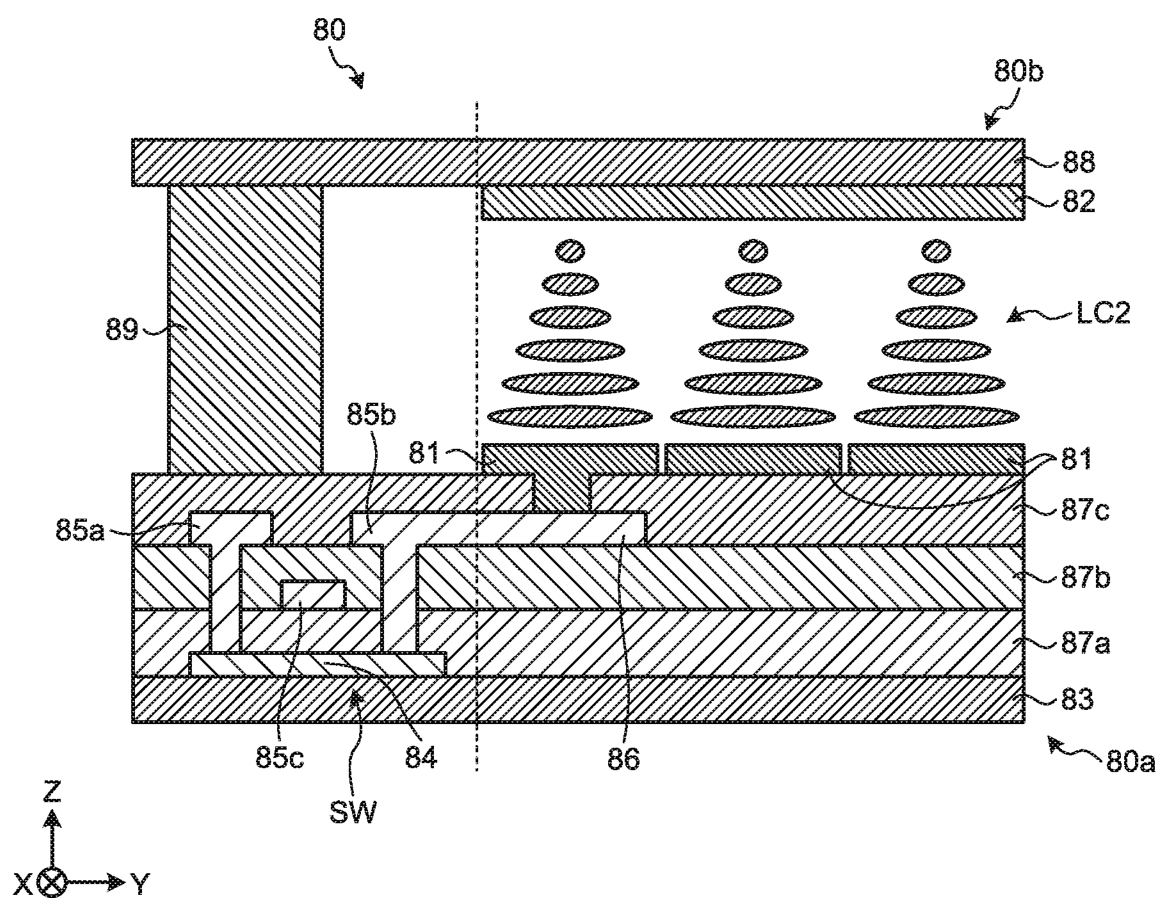
FIG. 9 is a sectional view of an exemplary schematic structure of the dimming panel.

FIG. 8 is a diagram illustrating an exemplary main configuration of the dimmer 70. FIG. 9 is a sectional view of an exemplary schematic structure of the dimming panel 80. The dimming panel 80 includes the first electrodes 81 provided in the dimming area DA. The dimming panel 80 illustrated in FIG. 8 includes the first electrodes 81 individually provided in positions corresponding to 36 respective coordinate points. The 36 coordinate points correspond to combinations of coordinates x1, x2, . . . , and x9 set along the X-direction and coordinates y1, y2, y3, and y4 set along the Y-direction. Each of the first electrodes 81 is coupled to the control circuit 90 through wiring 86. The control circuit 90 individually controls potentials of the first electrodes 81 according to the local dimming signal DI. Thus, the control circuit 90 individually controls the light transmittances of a plurality of regions LD each provided with the first electrode 81. In this manner, the dimming area DA includes the regions LD that are individually controllable in light transmittance. Since the above-mentioned number and arrangement of the display segment regions PA correspond to the number and arrangement of first electrodes 81, the position of each of the display segment regions PA corresponds to the position of a corresponding one of the regions LD. The dimming area DA is provided so as to cover the entire display area OA in the plan view, and is provided so as to be capable of individually controlling, in each of the regions LD, the transmittance of the light that is guided by the light guide plate LA and illuminates the entire display area OA from the back surface side thereof.

The dimmer 70 includes switches SW made of, for example, TFTs. Each of the switches SW includes a channel portion 84, a source 85*a*, a drain 85*b*, and a gate 85*c* that are mounted on a first transparent substrate 83 of the first substrate 80*a*. The source 85*a* is supplied with a predetermined output potential (any one of FRP, xFRP, FRP2, and FRP3 to be described later) provided by the control circuit 90. The drain 85*b* is electrically coupled to the wiring 86. The switch SW switches whether to supply a drain current to the first electrode 81 according to whether a signal is provided to the gate 85*c*. FIG. 9 schematically illustrates an electrical coupling relation between one of the switches SW and one of the first electrodes 81. Actually, however, every one of the first electrodes 81 is coupled to the drain 85*b* of the corresponding switch SW through a corresponding line of the wiring 86.

Each of the regions LD includes the first electrode 81 and a second electrode 82 that is provided in a position facing the first electrode 81 across the liquid crystal layer LC2. Specifically, the first substrate 80*a* includes the first transparent substrate 83, a first insulating layer 87*a* layered on the channel portion 84, a second insulating layer 87*b* layered on the gate 85*c* layered on the first insulating layer 87*a*, a third insulating layer 87*c* layered on the source 85*a* and the drain 85*b*, and the first electrodes 81 layered on the third insulating layer 87*c*. The second substrate 80*b* includes a second transparent substrate 88 and the second electrode 82 layered on the second substrate 80*b*. The first substrate 80*a* and the second substrate 80*b* are disposed such that a surface provided with the first electrodes 81 faces a surface provided with the second electrode 82. The liquid crystal layer LC2 is provided between the surface provided with the first electrodes 81 and the surface provided with the second electrode 82. A sealing material 89 for sealing the liquid crystal layer LC2 is provided between the first substrate 80*a* and the second substrate 80*b*. The first transparent substrate 83 and the second transparent substrate 88 are, for example, glass substrates. The first electrodes 81, the second electrode 82, and the wiring 86 are translucent electrodes made of, for example, an indium tin oxide (ITO).

The second electrode 82 of the first embodiment has a structure shared by the regions LD. Specifically, the second electrode 82 is a flat film-like electrode provided so as to cover the entire dimming area DA across the regions LD. The potential of each of the first electrodes 81 in the regions LD is independently controlled with respect to the potential (such as xFRP) of the second electrode 82 shared by the regions LD. As a result, the degree of twist of the liquid crystals in each region LD is individually controlled. This control individually controls the light transmittance of each region LD.

The dimming panel 80 of the first embodiment is a twisted nematic (TN) liquid crystal panel, and transmits light at the maximum transmittance when no current flows therethrough (i.e., normally white). This is a mere example of a specific form of the dimming panel 80. Not limited to this example, the dimming panel 80 may be a liquid crystal panel of another type, and may be a normally black panel. The form of the second electrode 82 described above is merely an example of a specific form of the second electrode 82; and the second electrode 82 is not limited to this example, and can be changed as appropriate. For example, one second electrode 82 may be provided in each of the regions LD in the same manner as the first electrode 81. In this case, potentials of the respective second electrodes 82 are controlled so as to be the same potential at the same time.

The control circuit 90 handles electrical signals for controlling the transmittances of the respective regions LD. The control circuit 90 is installed using, for example, a chip-on-glass (COG) technique, for example, in a frame area of the dimming panel 80 in the dimmer 70, the frame area being an area where the dimming area DA is not located. The control circuit 90 is coupled to each of the first electrodes 81 through the wiring 86. In this manner, the circuit for individually controlling the transmittances of the respective regions LD is provided outside the dimming area DA. As a result, the maximum light transmittance of the dimming area DA can be more easily increased.

Figure 10:
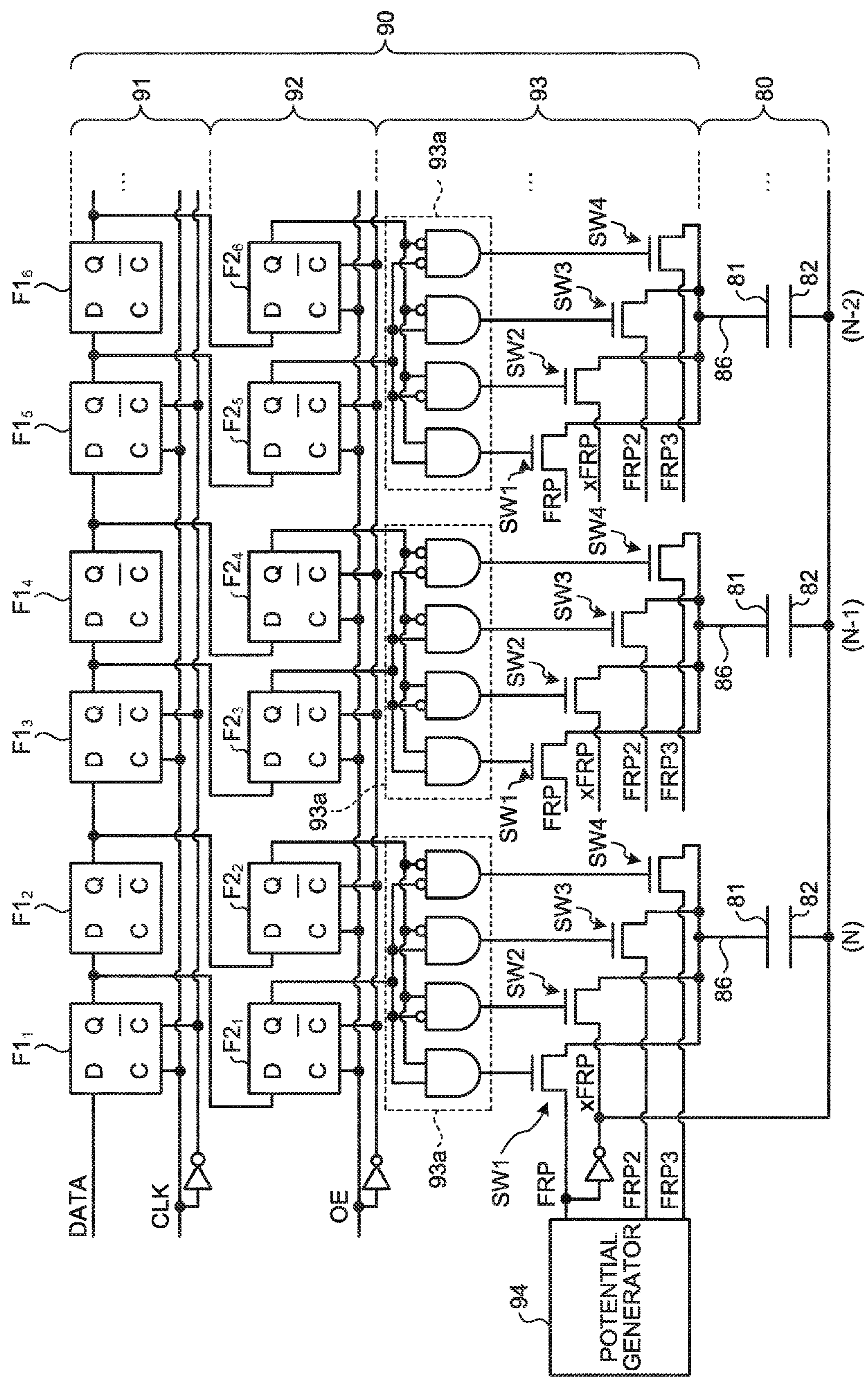
FIG. 10 is a diagram schematically illustrating an exemplary main configuration of a control circuit and an exemplary electrical coupling relation between the control circuit and the dimming panel.

FIG. 10 is a diagram schematically illustrating an exemplary main configuration of the control circuit 90 and an exemplary electrical coupling relation between the control circuit 90 and the dimming panel 80. The control circuit 90 includes a shift register 91, a static random access memory (SRAM) 92, a multiplexer 93, and a potential generator 94.

The shift register 91 receives the electrical signals for controlling potentials of the respective first electrodes 81, and has a configuration in which a plurality of sequential circuits (for example, registers, such as registers $F1_1$, $F1_2$, $F1_3$, $F1_4$, $F1_5$, and $F1_6$) are coupled in series. The SRAM 92 has a configuration in which outputs of the respective sequential circuits are coupled, and holds electrical signals output from the shift register 91 until a time to control the potentials. The SRAM 92 serves as a holding circuit in the first embodiment. The SRAM 92 holds these electrical signals, and simultaneously outputs them at the time to control the potentials. The SRAM 92 includes holding circuits (for example, registers, such as registers $F2_1$, $F2_2$, $F2_3$, $F2_4$, $F2_5$, and $F2_6$), the number of which corresponding to the number of the first electrodes 81. As a more specific example, letting N denote the number of the first electrodes 81, the number of registers included in each of the shift register 91 and the SRAM 92 is 2N. In the first embodiment, N=36. This is, however, a mere example of a specific value of N, and the value is not limited to this example. N is a natural number of 2 or larger.

FIG. 10 illustrates only the registers with reference numerals $F1_1$, $F1_2$, $F1_3$, $F1_4$, $F1_5$, and $F1_6$ as some of the registers included in the shift register 91. Actually, however, the shift register 91 includes 2N registers. FIG. 10 also illustrates only the registers with reference numerals $F2_1$, $F2_2$, $F2_3$, $F2_4$, $F2_5$, and $F2_6$ as some of the registers included in the SRAM 92. Actually, however, the SRAM 92 includes 2N registers. Hereinafter, the registers included in the shift register 91 may be each called a register F1 when not distinguished from one another, and the registers included in the SRAM 92 may be each called a register F2 when not distinguished from one another. Each of the registers F1 and F2 is a register constituted by, for example, a flip-flop circuit, and capable of holding 1-bit information.

The local dimming signal DI includes a first signal DATA, a second signal CLK, and a third signal OE (refer to FIG. 8). The first signal DATA is a signal for individually controlling the potential of each of the N first electrodes 81. The second signal CLK is a clock signal for controlling a transfer (shift) timing of information between the registers F1 included in the shift register 91. The third signal OE is a signal (output enable signal) for controlling an output timing of information from the SRAM 92 to the multiplexer 93.

The first signal DATA of the first embodiment is a serial-formatted electrical signal in which a 2-bit signal for controlling the potential of each one of the first electrode 81 continues by the number (N) of the first electrodes 81, the 2-bit signal being a set of two 1-bit signals. The shift register 91 of the first embodiment is provided corresponding to the first signal DATA. The shift register 91 has a serial-in parallel-out (SIPO) configuration in which the registers F1 are coupled together so as to each concurrently produce two outputs for one input. More specifically, the output of the register $F1_1$ located at the most upstream position among the registers F1 is coupled to the input of the register $F1_2$ located on the downstream side thereof and to the input of the register $F2_1$ of the SRAM 92. The 1-bit information received by the register $F1_1$ is shifted to the registers $F1_2$ and $F2_1$ according to a high/low switching timing of the second signal CLK. The output of the register $F1_2$ is coupled to the input of the register $F1_3$ located on the downstream side thereof and to the input of the register $F2_2$ of the SRAM 92. The 1-bit information received by the register $F1_2$ is shifted to the registers $F1_3$ and $F2_2$ according to the high/low switching timing of the second signal CLK. That is, the 1-bit information received by a register $F1_n$ is shifted to a register $F1_{n+1}$ and a register $F2_n$. The range of n is given as $1 \le n \le 2N$. If n=2N, the register F1 corresponding to the register $F1_{n+1}$ is not present. Consequently, the output to the register $F1_{n+1}$ has no effect in this case. At the time when the 1-bit information is shifted to the register F2 at the most downstream position (not illustrated) by the input of the first signal DATA, the SRAM 92 completes to hold the 2-bit signals for controlling the potentials of the N respective first electrodes 81. That is, the register $F2_n$ holds the 1-bit information received last by the register $F1_n$. In this manner, the output of each of the registers included in the shift register 91 is coupled to the input of a corresponding one of the registers included in the SRAM 92. The output of each of the registers included in the SRAM 92 is coupled to a corresponding one of the first electrodes 81 through the multiplexer 93.

The multiplexer 93 has a configuration in which the outputs of holding circuits are coupled together, and serves as a gradation voltage setter in the first embodiment. Specifically, the multiplexer 93 includes logic circuits 93*a* and a plurality of switches (such as first switches SW1, second switches SW2, third switches SW3, and fourth switches SW4) serving as the outputs. The multiplexer 93 opens any one of the switches according to an electrical signal output from the SRAM 92. Each of the first electrodes 81 is coupled to the outputs (such as a plurality of switches including the first, second, third, and fourth switches SW1, SW2, SW3, and SW4) of the gradation voltage setter. Specifically, each of the logic circuits 93*a* has four logic gates. Only one of the four logic gates produces a positive output according to a pattern represented by a set of two 1-bit input signals. A circuit constituting one of the four logic gates gives a positive output to the first switch SW1 when both the two 1-bit input signals represent high (H), thereby opening the first switch SW1. A circuit constituting another of the four logic gates gives a positive output to the second switch SW2 when one (first stage) of the two 1-bit input signals represents high (H) and the other (second stage) thereof represents low (L), thereby opening the second switch SW2. A circuit constituting still another of the four logic gates gives a positive output to the third switch SW3 when the other (second stage) of the two 1-bit input signals represents low (L) and one (first stage) thereof represents high (H), thereby opening the third switch SW3. Still another circuit constituting one of the four logic gates gives a positive output to the fourth switch SW4 when both the two 1-bit input signals represent low (L), thereby opening the fourth switch SW4. Each of the first, second, third, and fourth switches SW1, SW2, SW3, and SW4 has the same specific configuration as that of the above-described switches SW.

The potential generator 94 is a circuit that generates one or more potentials (such as three different potentials of FRP, FRP2, and FRP3) based on the number of gradations of the light transmittance individually settable in each of the regions LD included in the dimming area DA. One (such as FRP) of the potentials generated by the potential generator 94 is directly used, and also used as a potential (xFRP) inverted from positive to negative, or vice versa, by a positive/negative inverting circuit. The potential xFRP is a signal obtained by inverting the polarity and voltage level of FRP. That is, the difference between high and low potentials of xFRP is equal to the difference between high and low potentials of FRP, but the polarity is inverted. In the example illustrated in FIG. 10, the first switch SW1 receives a potential of FRP; the second switches SW2 receives a potential of xFRP; the third switches SW3 receives a potential of FRP2; and the fourth switches SW4 receives a potential of FRP3. The drains of the first, second, third, and fourth switches SW1, SW2, SW3, and SW4 are electrically coupled to the first electrode 81 through the wiring 86. That is, after the output is performed from the SRAM 92 according to the output timing of the third signal OE, any one of the switches is opened, and the potential of the first electrode 81 is controlled so as to be a potential corresponding to the potential applied to the opened switch.

The output of the positive/negative inverting circuit is also coupled to the second electrode 82. That is, the second electrode 82 has a potential (xFRP) inverted from positive to negative, or vice versa, by the output of the positive/negative inverting circuit.

FIG. 11 is a table illustrating exemplary correspondence relations each between the set of two 1-bit signals constituting the 2-bit signal for controlling the potential of one of the first electrodes 81 and the potential of the first electrode 81. Each of the two 1-bit signals constituting the 2-bit signal takes either one of two values (such as 1 or 0) for distinguishing between high (H) and low (L) levels. In the first embodiment, of two registers F1 used for holding the 2-bit signal representing the potential of one of the first electrodes 81, the register F1 on the downstream side is assumed to serve as the first stage, and the register F1 on the upstream side is assumed to serve as the second stage. As a specific example, of the two registers F1 used for holding the 2-bit signal representing the potential of the N-th first electrode 81 illustrated in FIG. 10, $F1_2$ serves as the first stage, and $F_1$ serves as the second stage. Of the two registers F1 used for holding the 2-bit signal representing the potential of the (N−1)-th first electrode 81, $F1_4$ serves as the first stage, and $F1_3$ serves as the second stage. Of the two registers F1 used for holding the 2-bit signal representing the potential of the (N−2)-th first electrode 81, $F1_6$ serves as the first stage, and $F1_5$ serves as the second stage. Although not illustrated, of the subsequent registers, the register F1 located on a more downstream side is used for the first electrode 81 corresponding to a potential represented by the 2-bit signal received earlier. In the shift register 91, since the serial data received earlier is held by the register F1 on the more downstream side, the 2-bit signal received first is held by the two registers F1 located on the most downstream side. Each of (N), (N−1), and (N−2) illustrated in FIG. 10 represents the sequential position of the 2-bit signal among N 2-bit signals included in the serial data corresponding to the N first electrodes 81. For example, (N) represents the last (Nth) one of the N 2-bit signals. Each of the first electrodes 81 at coordinates illustrated in FIG. 8 can be in any sequential position.

As illustrated in FIG. 11, when both the first and second stages are high (H), the potential of the first electrode 81 is set to FRP because the first switch SW1 opens (refer to FIG. 10). When the first stage is high (H) and the second stage is low (L), the potential of the first electrode 81 is set to xFRP because the second switch SW2 opens. When the first stage is low (L) and the second stage is high (H), the potential of the first electrode 81 is set to FRP2 because the third switch SW3 opens. When both the first and second stages are low (L), the potential of the first electrode 81 is set to FRP3 because the fourth switch SW4 opens (refer to FIG. 10).

The correspondence relations each between the data form of the 2-bit signal and the potential of the first electrode 81 illustrated in FIG. 11 are mere examples. The correspondence relations are, however, not limited thereto, and can be changed as appropriate. The multiplexer 93 can be replaced with another circuit, such as a decoder. In that case, the data received by the shift register 91 and the SRAM 92 is data output from an encoder that encodes data using an encoding scheme corresponding to decoding scheme of the decoder that has been used for decoding the data.

FIG. 12 is a diagram illustrating an exemplary relation between the potential of the first electrode 81 and the potential of the second electrode 82. As illustrated in FIG. 12, FRP, xFRP, FRP2, and FRP3 are pulse signals having different potentials from one another after rising of the pulses. Specifically, the potentials after rising and after falling of the pulse of xFRP are inversed with respect to the potentials after rising and after falling of the pulse of FRP. The potential of FRP2 after rising is lower than that of FRP, and the potential of FRP2 after falling is higher than that of FRP. The potential of FRP3 after rising is lower than those of FRP and FRP2, and the potential of FRP3 after falling is higher than those of FRP and FRP2. In the first embodiment, the potential of FRP after falling is 0 V.

In the first embodiment, the potential of the second electrode 82 is xFRP. Considering the differences (potential differences) between the potentials after rising of respective pulses of FRP, xFRP, FRP2, and FRP3, which are possible potentials of the first electrode 81, and the potential (xFRP) of the second electrode 82 at that time, the potentials are arranged as follows in descending order of potential difference: FRP, FRP2, FRP3, and xFRP. The degree of twist of the liquid crystal layer LC2 between the first electrode 81 and the second electrode 82, which determines the transmittance of each of the regions LD, corresponds to the potential difference between the first electrode 81 and the second electrode 82. Consequently, the transmittance can have multiple gradations by allowing the first electrode 81 to have three or more potential levels (such as four potential levels of FRP, FRP2, FRP3, and xFRP). In the first embodiment, since the dimming panel 80 is a TN panel and is normally white, the maximum transmittance can be obtained when the potential of the first electrode 81 is xFRP that is equal to the potential of the second electrode 82. The minimum transmittance can be obtained when the potential of the first electrode 81 is FRP.

In this manner, the transmittance of the regions LD has three or more gradations (such as four gradations) set within a transmittance range including the minimum transmittance and the maximum transmittance. The electrical signal (DATA) received by the shift register 91 is a signal representing any one of the three or more gradations. Two or more (such as two) of both the registers F1 and F2 are provided for each one of the first electrodes 81.

The shift register 91 sequentially receives the electrical signal (such as the set of two 1-bit signals constituting the 2-bit signal) corresponding to the gradation level of each of the regions LD. In the following description, the light quantity given to the display segment region PA according to the transmittance of the region LD is schematically represented by eight bits (0 to 255). When the potential of the first electrode 81 is xFRP and the region LD has the maximum transmittance (1), the light quantity given to the display segment region PA is assumed to be the maximum light quantity (255). When the potential of the first electrode 81 is FRP and the region LD has the minimum transmittance (0), the light quantity given to the display segment region PA is assumed to be the minimum light quantity (0). When the potential of the first electrode 81 is FRP2, the light quantity given to the display segment region PA is assumed to be the second lowest light quantity. When the potential of the first electrode 81 is FRP3, the light quantity given to the display segment region PA is assumed to be the second highest light quantity.

Figure 13:
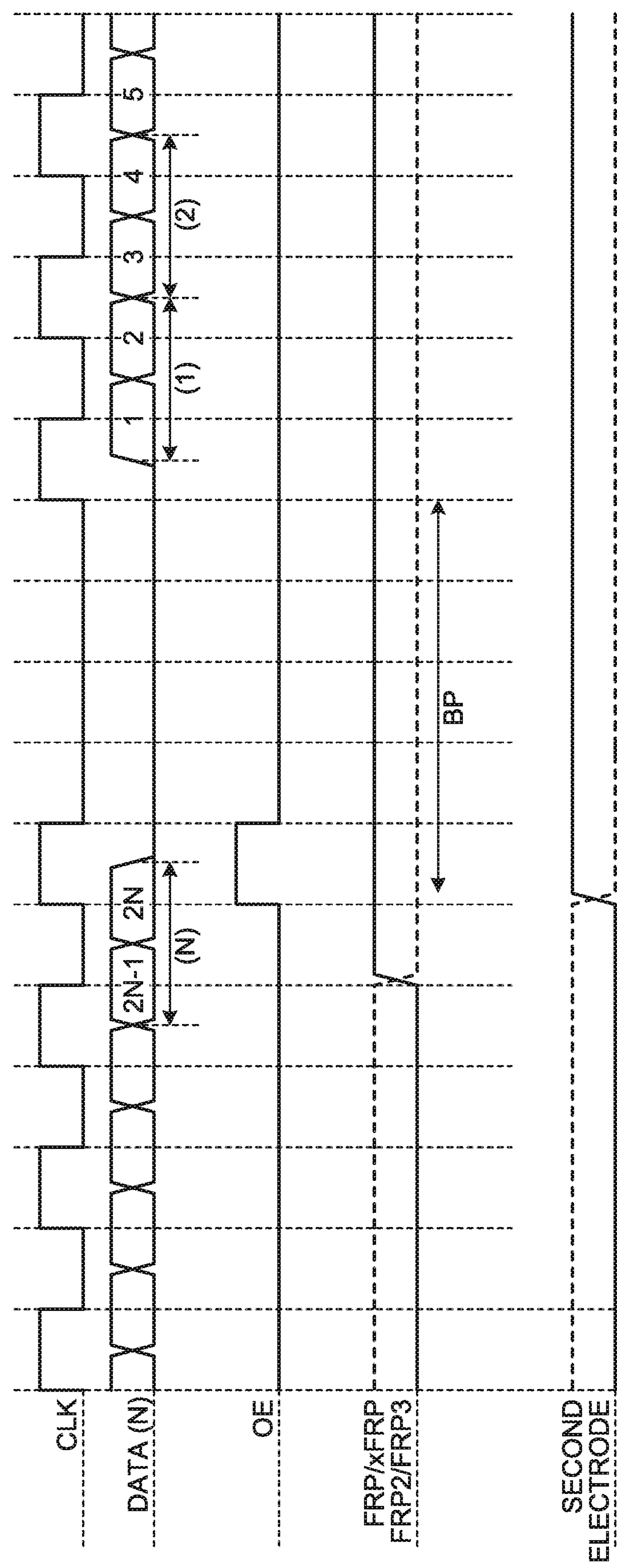
FIG. 13 is a timing diagram illustrating an example of relations of input timings of first, second, and third signals with an inversion timing of an output potential from the control circuit and an inversion timing of the potential of the second electrode.

FIG. 13 is a timing diagram illustrating an example of relations of input timings of the first signal DATA, the second signal CLK, and the third signal OE with an inversion timing of the output potential from the control circuit 90 and an inversion timing of the potential of the second electrode 82. As illustrated in FIG. 13, the shift register 91 receives the first signal DATA in synchronization with the second signal CLK. The shift register 91 takes in the 2-bit signal at each of the timings corresponding to rising and falling edges of the second signal CLK. The shift register 91 sequentially shifts the first signal DATA at the above-described timings. In FIG. 13, "2N−1" and "2N" are assigned to the set of two 1-bit signals constituting the 2-bit signal corresponding to the first electrode 81 assigned with (N) (refer to FIG. 10). The set of two 1-bit signals assigned with "1" and "2" is the 2-bit input signal received first; the set of two 1-bit signals assigned with "3" and "4" is the 2-bit input signal received second after the first; and so on.

In the first embodiment, after the data is shifted to the last stage of the shift register 91, all the pieces of data are output to the outputs of the SRAM 92 by a pulse of the third signal OE, and the logic of the data is held until the next OE pulse occurs.

In the first embodiment, the electrical signals applied to the first electrodes 81 and the second electrode 82 are inverted in polarity at a predetermined period. Specifically, for example, the potential generator 94 inverts the positive and negative of FRP, xFRP, FRP2, and FRP3 at the predetermined period. The predetermined period is, for example, a period (cycle) synchronous with a setting (updating) period of transmittance of each region LD. More specifically, as illustrated in FIG. 13, the potential generator 94 inverts the positive and negative of FRP, xFRP, FRP2, and FRP3 before the third signal OE is received so as to switch the positive and negative of the potential (xFRP) of the second electrode 82 when the third signal OE is received. The inversion drive may be line-by-line inversion drive, inversion drive in units of the first electrodes 81 (on a dot-by-dot basis), or another inversion drive type.

In the first embodiment, a blanking period (BP) is set in the setting (updating) period of transmittance of each of the regions LD synchronous with an updating period of a frame image. During the blanking period, for example, switching elements (such as the switches SW) provided in the display panel and the dimming panel 80 are reset.

The following describes a method for determining the transmittance of each of the regions LD, with reference to FIG. 2. The image analyzer 11 performs analysis to identify the gradation values of the pixels 48 driven at the highest gradation value among the pixels 48 included in the display segment region PA. The image analyzer 11 individually performs the analysis on each of the display segment regions PA. The dimming controller 12 determines the transmittance of each of the regions LD such that light having a light quantity corresponding to the gradation values of the pixels 48 driven at the highest gradation value in each of the display segment regions PA is emitted to the display segment region PA.

For example, if each of the R, G, and B signals included in the input signal IP is an 8-bit signal, the maximum gradation values are represented as (R, G, B)=(255, 255, 255), and the minimum gradation values are represented as (R, G, B)=(0, 0, 0). In the first embodiment, if the gradation values of all the pixels 48 in the display segment region PA are (R, G, B)=(0, 0, 0), the light quantity required for this display segment region PA is the minimum light quantity (0), and the transmittance of a region LD in a position corresponding to this display segment region PA is the minimum transmittance (0). If the gradation values of one or more of the pixels 48 exceed (R, G, B)=(0, 0, 0) and the gradation values of pixels 48 driven at the highest gradation value are equal to or lower than (R, G, B)=(63, 63, 63), the light quantity required for this display segment region PA is the second lowest light quantity (63), and the transmittance of the region LD in the position corresponding to this display segment region PA is the second lowest transmittance (0.25). If the gradation values of one or more of the pixels 48 exceed (R, G, B)=(64, 0, 0), (R, G, B)=(0, 64, 0), or (R, G, B)=(0, 0, 64) and the gradation values of pixels 48 driven at the highest gradation value are equal to or lower than (R, G, B)=(127, 127, 127), the light quantity required for this display segment region PA is the second highest light quantity (127), and the transmittance of the region LD in the position corresponding to this display segment region PA is the second highest transmittance (0.5). If the gradation values of one or more of the pixels 48 exceed (R, G, B)=(128, 0, 0), (R, G, B)=(0, 128, 0), or (R, G, B)=(0, 0, 128), the light quantity required for this display segment region PA is the maximum light quantity (255), and the transmittance of the region LD in the position corresponding to this display segment region PA is the maximum transmittance (1). The relation between the light quantity required for the display segment region PA and the transmittance of the region LD as described above is a mere example. The relation is, however, not limited to this example. Specific relations among the gradation values, the light quantity, and the transmittance can be changed as appropriate.

The image analyzer 11 outputs information indicating the result of the analysis to the dimming controller 12 and the corrector 14. The dimming controller 12 generates the local dimming signal DI by reflecting, in the first signal DATA, information represented by the result of the analysis indicating the transmittance of each of the regions LD corresponding to the light quantity required for a corresponding one of the display segment regions PA, and outputs the generated local dimming signal DI to the dimming buffer 13 and the corrector 14.

The following describes, with reference to FIG. 2, processing applied to the output image signal OP according to the transmittances of the regions LD. The corrector 14 performs correction to correct the gradation values of the pixels 48 included in each of the display segment regions PA according to the transmittance of the corresponding region LD. The correction is a process to multiply the gradation values by the reciprocal of the transmittance on a basis that the minimum transmittance is 0 and the maximum transmittance is 1.

For example, if the gradation values of the pixels 48 driven at the highest gradation value are (R, G, B)=(127, 127, 127), the transmittance of the region LD in the position corresponding to this display segment region PA is controlled to be the second highest transmittance, so that the light quantity emitted to this display segment region PA is the second highest light quantity (127). The gradation values of (R, G, B)=(127, 127, 127) correspond to a light quantity on the assumption that the light quantity emitted to this display segment region PA is the maximum light quantity (255). Therefore, if the gradation values of (R, G, B)=(127, 127, 127) are directly reflected in the output image signal OP without being corrected, display output corresponding to the gradation values of (R, G, B)=(127, 127, 127) cannot be performed in the state where the light quantity emitted to this display segment region PA is the light quantity (second highest light quantity (127)) lower than the maximum light quantity. Thus, in the first embodiment, in such a case, the gradation values of (R, G, B)=(127, 127, 127) are corrected in accordance with the light quantity (second highest light quantity (127)) emitted to this display segment region PA so as to enable the same output as the output corresponding to the gradation values of (R, G, B)=(127, 127, 127) when the light quantity is the maximum light quantity (255). Specifically, when the second highest light quantity (127) is emitted, the transmittance of the region LD is the second highest transmittance (0.5). The reciprocal of this transmittance is 2. The corrector 14 updates the gradation values to values obtained by multiplying the gradation values of (R, G, B)=(127, 127, 127) by the reciprocal of the transmittance (2). In this case, the gradation values after the correction are (R, G, B)=(254, 254, 254). The gradation values may have other values. In this case, the corrector 14 updates the gradation values of the pixels 48 by performing the correction using the same scheme even if the transmittance has another value. The above-described processing is an example of local dimming processing, and is processing of extending gradation data (gradation values) to be output to the liquid crystal panel by the decreased amount of light to be emitted to the liquid crystal panel.

The corrector 14 updates the gradation values of the pixels 48 included in each of the display segment regions PA according to the transmittance of the corresponding one of the regions LD. The corrector 14 may omit the correction process for the display segment region PA corresponding to the region LD having the maximum transmittance (1). In this manner, the corrector 14 corrects the signal to be output to the image display panel 30 according to the transmittance, and reflects the result in the output image signal.

In the first embodiment, since each of the pixels 48 includes the fourth sub-pixel 49W, the corrector 14 performs conversion to assign a gradation value assignable to the fourth sub-pixel 49W to the fourth sub-pixel 49W, and reflects the result to the output image signal OP. For example, the corrector 14 converts the gradation values (R, G, B)=(254, 254, 254) after the correction into (R, G, B, W)=(0, 0, 0, 254). The corrector 14 performs the correction and the conversion to generate the output image signal OP, and outputs it to the image buffer 15.

The image buffer 15 and the dimming buffer 13 are each configured to serve as a storage area constituted by a random access memory (RAM) or the like. The synchronizer 16 synchronizes an image frame of the input signal IP serving as a basis of the output image signal OP stored in the image buffer 15 with an image frame of the input signal IP serving as a basis of the local dimming signal DI stored in the dimming buffer 13, and outputs the image frames at the same time from the image buffer 15 and the dimming buffer 13. This operation can match the frame image displayed in the display area OA with the light quantity emitted to the image display panel 30 when the frame image is output for display.

The light source controller 17 outputs the light source drive signal BL to the light source device 50 so as to operate the light source device 50 during a period in which the local dimming signal DI is output in accordance to the input of the input signal IP. The light source device 50 lights the light sources 51 in accordance to the light source drive signal BL.

Figure 14:
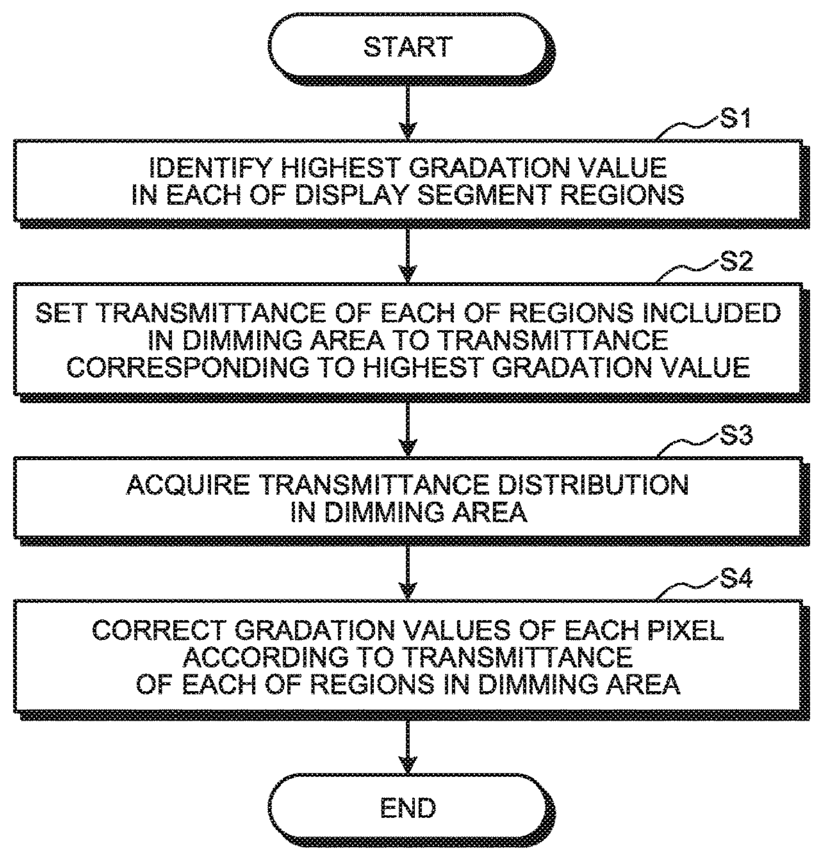
FIG. 14 is an exemplary flowchart of processing by the signal processor.

FIG. 14 is an exemplary flowchart of processing by the signal processor 10. The image analyzer 11 performs the analysis to identify the pixel 48 having the highest gradation value in each of the display segment regions PA (Step S1). The dimming controller 12 sets the transmittance of each of the regions LD included in the dimming area DA to a transmittance value corresponding to the highest gradation value in a corresponding one of the display segment regions PA identified at Step S1 (Step S2). Specifically, the dimming controller 12 generates, for example, the local dimming signal DI for setting the transmittance of each of the regions LD to the transmittance value corresponding to the highest gradation value in the corresponding display segment region PA, and outputs the generated local dimming signal DI to the dimming buffer 13 and the corrector 14. The corrector 14 acquires a transmittance distribution of the dimming area DA represented by the transmittance of each of the regions LD output from the dimming controller 12 (Step S3). The corrector 14 corrects the gradation values of the pixels 48 according to the transmittance of each of the regions LD (Step S4).

Figure 15:
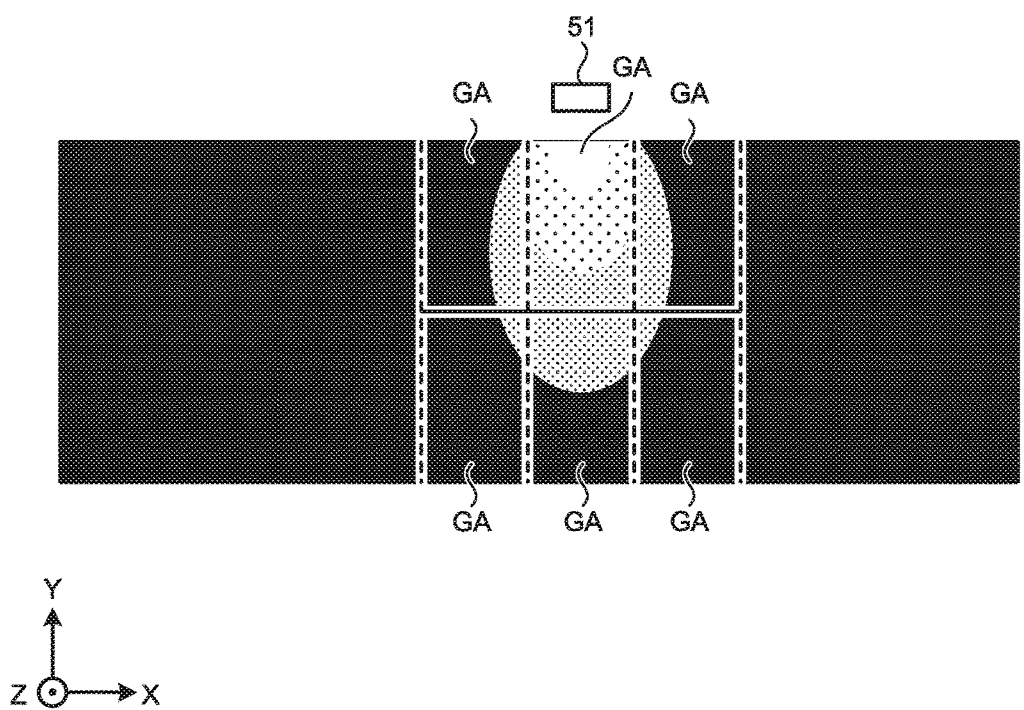
FIG. 15 is a diagram illustrating an exemplary light quantity distribution when the dimming panel is not employed.

FIG. 15 is a diagram illustrating an exemplary light quantity distribution when the dimming panel 80 is not employed. As illustrated in FIG. 15, light from one of the light sources 51 may be diffused and partially emitted to surrounding light source regions GA other than the light source region GA closest to the light source 51. If the dimmer 70 is not provided, it is difficult to control the light quantities of the light sources 51 in accordance with light quantities required for the respective display segment regions PA. By contrast, the dimmer 70 of the present embodiment controls the transmittance of each region LD, and thus the required light quantity can be emitted to each of the display segment regions PA regardless of whether the light from the light source 51 is diffused in this way.

Aside from the side-lit backlight, there is a direct-lit backlight in which an individual light source is provided on the back surface side of each of the display segment regions PA. However, the width (thickness) in the Z-direction of a light source device of the direct-lit backlight is much larger than that of a light source device (such as the light source device 50) of the side-lit backlight using the light guide plate LA. In contrast, according to the first embodiment, the sum of the thicknesses of the light source device 50 and the dimming panel 80 can be smaller than the thickness of the light source device of the direct-lit backlight.

As described above, according to the first embodiment, the light quantity of the light source device 50 is individually controlled by controlling the transmittance of each of the regions LD. As a result, the local dimming can be more accurately performed. The control circuit 90 includes the shift register 91, which receives the electrical signals for controlling the potentials of the respective first electrodes 81, and the SRAM 92, which serves as the holding circuit. The holding circuit holds the electrical signals received by the shift register 91 and simultaneously outputs them to the first electrodes 81. Consequently, the transmittance values of the regions LD can be set (updated) at the same time.

Further, the shift register 91 sequentially receives the electrical signal (such as the set of two 1-bit signals constituting the 2-bit signal) corresponding to the gradation level of each of the regions LD, and an input path of such a serial signal is provided regardless of the number of the regions LD. Thus, the gradation level of each of the regions LD can be individually controlled. The specific type of the electrical signal is not limited to the 2-bit signal, but may be a 1 bit-signal or a signal of three or more bits. The specific configuration of each of the shift register 91 and the SRAM 92 corresponds to the specific type of the electrical signal.

Each of the shift register 91 and the SRAM 92 includes the registers corresponding in number to the first electrodes 81; the output of each of the registers included in the shift register 91 is coupled to the input of a corresponding one of the registers of the SRAM 92; and the output of each of the registers included in the SRAM 92 corresponds to one of the first electrodes 81. As a result, the signal input-output mechanism for controlling the transmittance of each of the regions LD can be simplified in configuration.

Since the transmittance has three or more gradation levels, more flexible local dimming can be performed corresponding to the required light quantity in accordance with the display output image.

Since the corrector 14 is provided for correcting the signal to be output to the image display panel 30 according to the transmittance, gradability of an image can be ensured, although the light quantity is controlled by the local dimming.

The display area OA includes the display segment regions PA corresponding to the positions of the respective regions LD, and the corrector 14 performs the correction to correct the gradation values of the pixels 48 included in each of the display segment regions PA according to the transmittance of the corresponding region LD. As a result, the gradability of the display output image of each of the pixels 48 can be ensured, although the light quantity is controlled by the local dimming.

Since the electrical signals applied to the first electrodes 81 and the second electrode 82 are inverted in polarity at the predetermined period, the liquid crystal panel can be restrained from deteriorating due to direct-current drive, and thus, the lifetime of the dimming panel 80 can be increased.

Since the dimming panel 80 is located between the image display panel 30 and the light source device 50, the light quantity can be controlled between the image display panel 30 and the light source device 50, and thus, the accuracy of the local dimming can be more easily ensured.

Since the light source device 50 is a side-lit device, the light source device 50 can be thinner.

Second Embodiment

Figure 16:
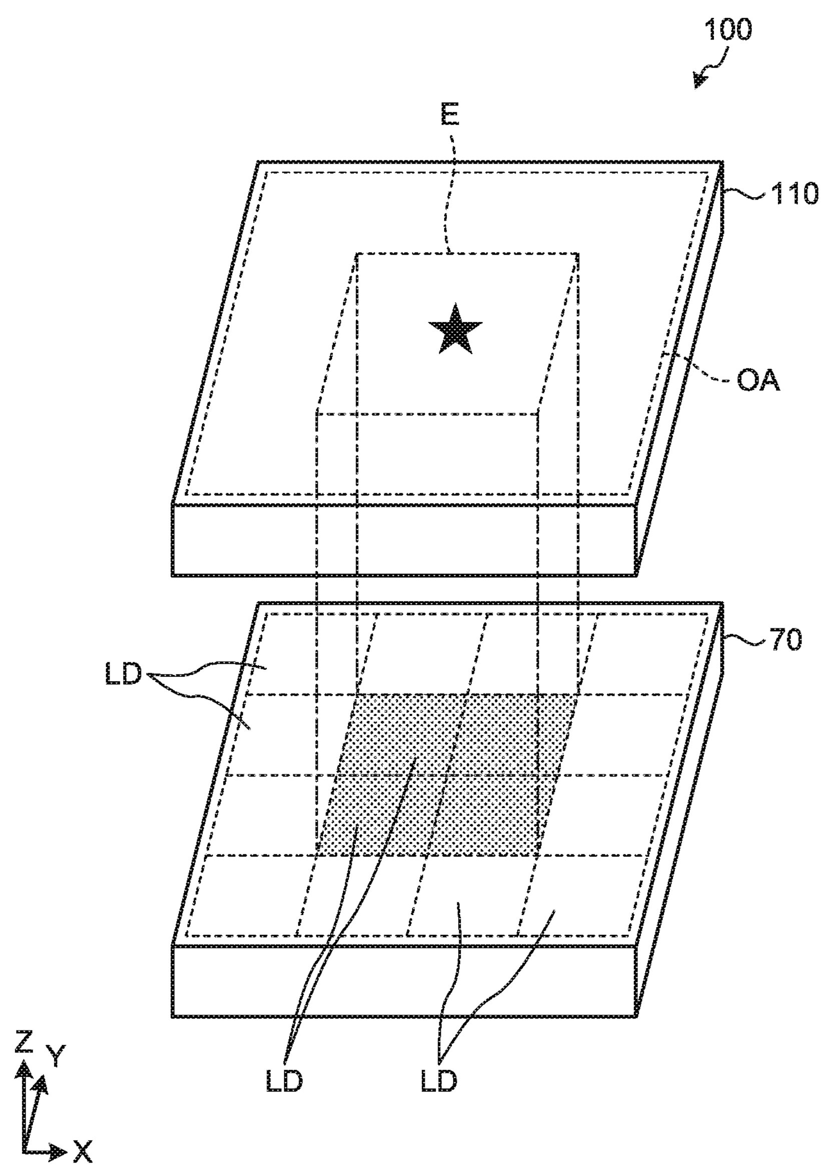
FIG. 16 is a diagram illustrating an exemplary main configuration of a display device according to a second embodiment of the present invention.

FIG. 16 is a diagram illustrating an exemplary main configuration of a display device 100 according to a second embodiment of the present invention. The display device 100 according to the second embodiment includes a polymer-dispersed liquid crystal panel 110 and the dimmer 70 provided on a back surface side (on a side of a first translucent substrate 120, to be described later) of the polymer-dispersed liquid crystal panel 110.

Figure 17:
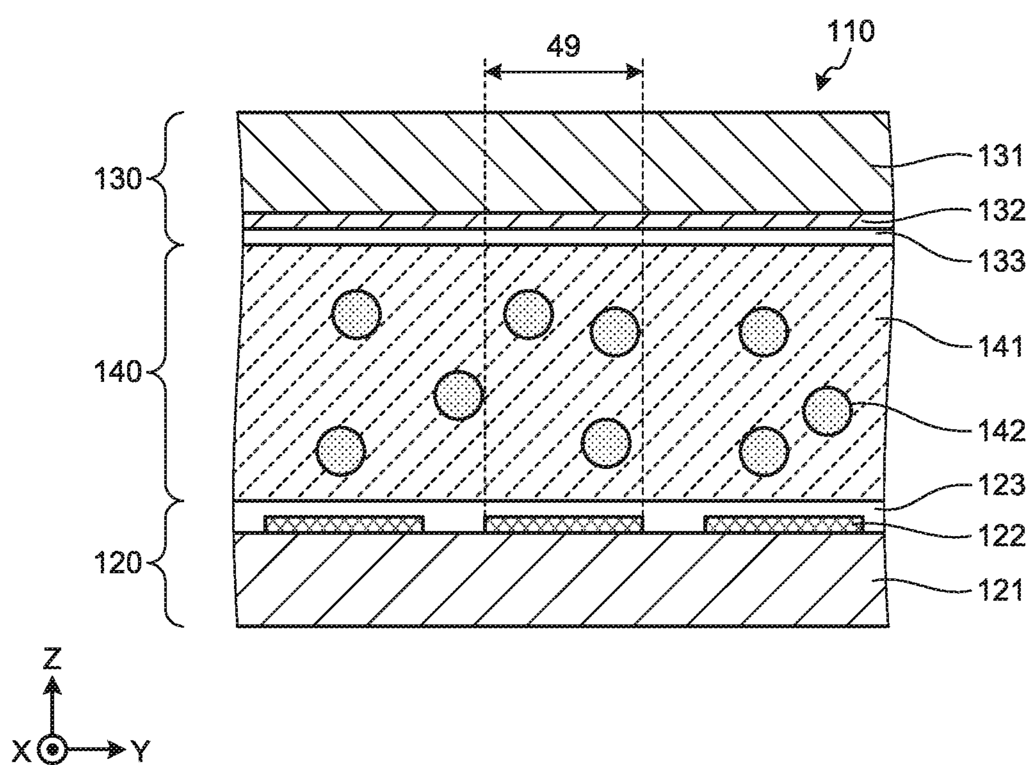
FIG. 17 is a schematic diagram illustrating an exemplary configuration of a polymer-dispersed liquid crystal panel.

FIG. 17 is a schematic diagram illustrating an exemplary configuration of the polymer-dispersed liquid crystal panel 110. As illustrated in FIG. 17, pixel electrodes 122 serving as transparent electrodes and a first orientation film 123 are provided on a glass substrate 121 of the first translucent substrate 120, and a common electrode 132 serving as a transparent electrode and a second orientation film 133 are provided on a glass substrate 131 of a second translucent substrate 130. The first orientation film 123 and the second orientation film 133 are, for example, vertical orientation films.

A solution obtained by diffusing liquid crystals in a monomer of a polymer fills a space between the first translucent substrate 120 and the second translucent substrate 130. Then, in the state where the monomer and the liquid crystals are oriented by the first and second orientation films 123 and 133, the monomer is polymerized by ultraviolet rays or heat to form a bulk 141. This process forms a liquid crystal layer 140 including reverse mode polymer-dispersed liquid crystals in which liquid crystals are dispersed in spaces of a polymer network formed into a mesh-like shape.

In this manner, the liquid crystal layer 140 includes the bulk 141 formed of the polymer and a plurality of fine particles 142 dispersed in the bulk 141. The fine particles 142 are made of the liquid crystals. The bulk 141 and the fine particles 142 are both optically anisotropic.

The orientation of the liquid crystals contained in the fine particles 142 is controlled by a voltage difference between each of the pixel electrodes 122 and the common electrode 132. If the voltage of the common electrode 132 is constant, the orientation of the liquid crystals changes with a voltage applied to the pixel electrodes 122. The change in the orientation of the liquid crystals changes the degree of scattering of light passing through the sub-pixels 49.

In the second embodiment, the dimmer 70 is provided on the first translucent substrate 120 side of the polymer-dispersed liquid crystal panel 110, and adjusts the transmittance of the light on the first translucent substrate 120 side. This configuration can make clearer the display output on a portion E of the display area OA of the polymer-dispersed liquid crystal panel 110 where the image is displayed. FIG. 16 highlights the display output image in the portion E by making the regions LD corresponding to the portion E darker than the regions LD corresponding to the other portions. However, the relation in brightness may be reversed between the regions LD corresponding to the portion E and the regions LD corresponding to the other portions.

Third Embodiment

Figure 18:
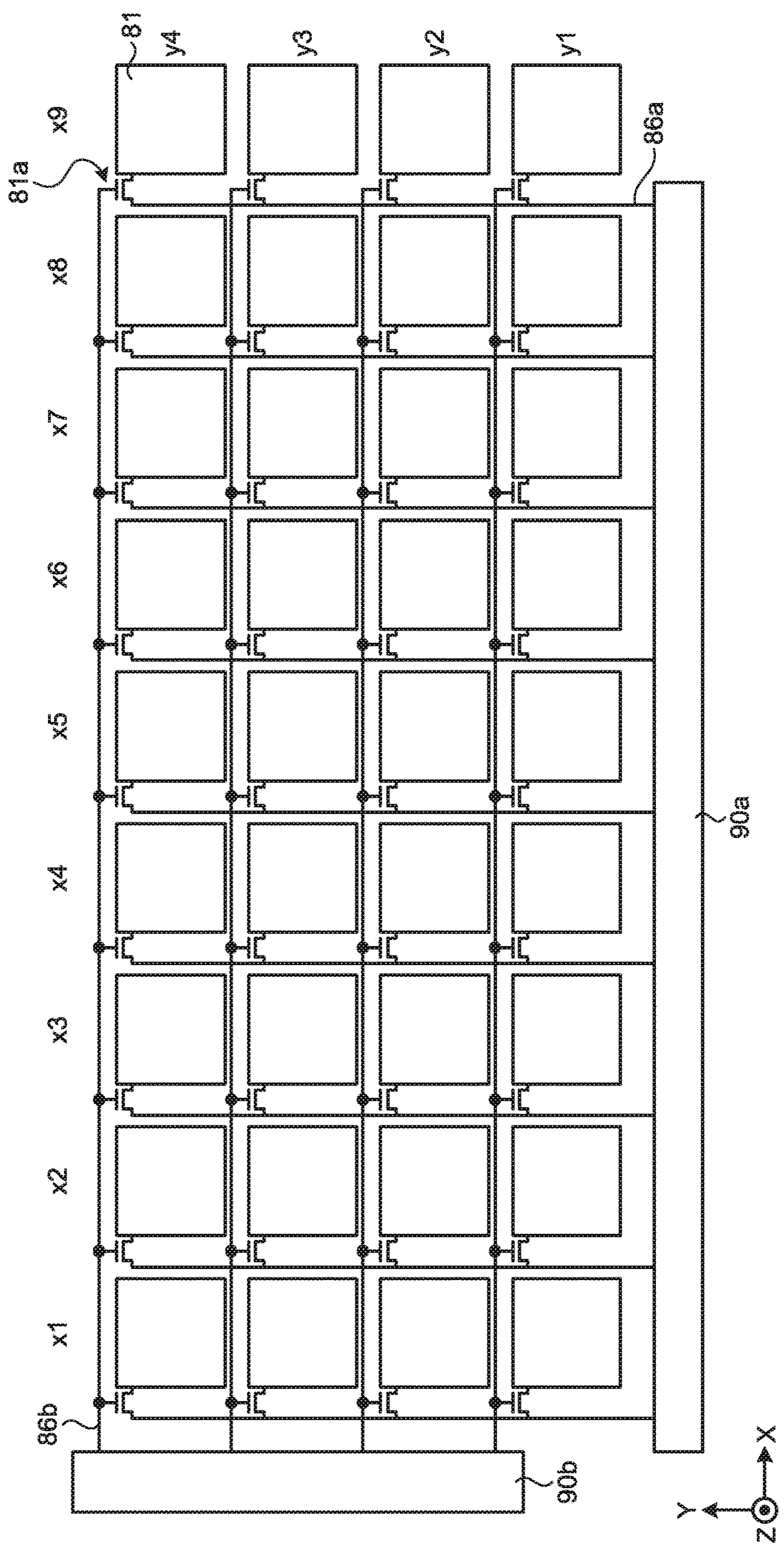
FIG. 18 is a diagram illustrating an exemplary main configuration of a dimmer according to a third embodiment of the present invention.
Figure 19:
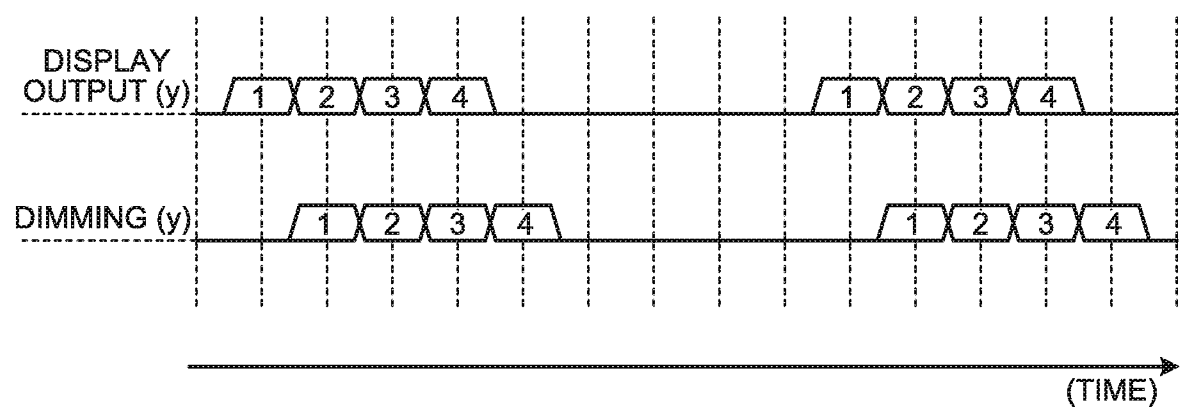
FIG. 19 is a timing diagram illustrating an example of relations of display output timings with dimming timings according to the third embodiment.

FIG. 18 is a diagram illustrating an exemplary main configuration of a dimmer according to a third embodiment of the present invention. FIG. 19 is a timing diagram illustrating an example of relations of display output timings with dimming timings according to the third embodiment. In the description of the third embodiment, the same reference numerals as those used in the description of the first embodiment are assigned to the same components as those of the first embodiment.

In the third embodiment, each of the first electrodes 81 is coupled to a corresponding one piece of wiring **86*a* through a switching element 81*a*, such as a TFT element. One of the source and the drain of the switching element 81*a* is coupled to the wiring 86*a*, and the other thereof is coupled to the first electrode 81. The gate of the switching element 81*a* is coupled to a scanning line 86*b***.

The number of lines of the wiring **86*a* corresponds to the number of the first electrodes 81 (nine in the case of the example illustrated in FIG. 18) arranged along one of the two directions (such as the X-direction) orthogonal to the Z-direction. Each line of the wiring 86*a* is shared by the first electrodes 81 arranged along the other of the two directions (such as the Y-direction) orthogonal to the Z-direction. In the case of the example illustrated in FIG. 18, one line of the wiring 86*a* is coupled to four switching elements 81*a* that are respectively coupled to four first electrodes 81 corresponding to respective coordinates of y1 to y4. The number of the scanning lines 86***b* corresponds to the number of the first electrodes 81 (four in the case of the example illustrated in FIG. 18) arranged along the other of the two directions (such as the Y-direction) orthogonal to the Z-direction. Each of the scanning lines 86*b* is shared by the first electrodes 81 arranged along one of the two directions (such as the X-direction) orthogonal to the Z-direction. In the case of the example illustrated in FIG. 18, one scanning line 86*b* is coupled to nine switching elements 81*a* that are respectively coupled to nine first electrodes 81 corresponding to respective coordinates of x1 to x9.

In the third embodiment, a control circuit 90*a* is provided instead of the control circuit 90 of the first embodiment. In addition, in the third embodiment, a scanning circuit 90*b* is provided. The control circuit 90*a* has the same configuration as that of the control circuit 90, except that the number of the sequential circuits included in the shift register 91 and the number of the holding circuits included in the SRAM 92 correspond to the number of the first electrodes 81 (nine in the case of the example illustrated in FIG. 18) arranged along one of the two directions (such as the X-direction) orthogonal to the Z-direction. The scanning circuit 90*b* sequentially outputs a scan signal to each of the scanning lines 86*b* along with progression of scanning for the display output (updating) performed on the image display panel 30. The switching element 81*a* switches opening/closing of the coupling between the first electrode 81 and the wiring 86*a* according to the timing at which the scan signal is output to the gate of the switching element 81*a*. The arrangement direction of the scanning lines 86*b* serving as targets of the sequential output of the scan signals from the scanning circuit 90*b* and the arrangement direction (scanning direction) of the scanning lines SCL serving as targets of the sequential output of the drive signals from the scanning circuit 42 of the image display panel 30 are along the other of the two directions (such as the Y-direction) orthogonal to the Z-direction.

In the third embodiment, setting (or updating) of the transmittance values of the regions LD progresses with the progression of the scanning for the display output (updating) performed on the image display panel 30. Specifically, after the display output (updating) of the display segment regions PA corresponding to the coordinate of y1 is completed, the scanning circuit 90*b* outputs scan signals to the scanning line 86*b* coupled to the first electrodes 81 corresponding to the coordinate of y1 through the switching elements 81*a*. At this time, the control circuit 90*a* outputs, to the wiring 86*a*, electrical signals representing transmittance values of the dimming area DA corresponding to the coordinate of y1. This operation controls potentials of the first electrodes 81 disposed in the dimming area DA corresponding to the coordinate of y1 so as to be potentials corresponding to the respective transmittance values of the dimming area DA. In this manner, the setting (updating) of the transmittance values of the dimming area DA corresponding to the coordinate of y1 is completed after the display output (updating) of the display segment regions PA corresponding to the coordinate of y1 is completed. Specifically, after the display output (updating) of the display segment regions PA corresponding to the coordinate of y1 is completed, TFTs (such as the switching elements 81*a* and the switches SW) coupled to the respective regions LD included in the dimming area DA corresponding to the coordinate of y1 are turned ON. This operation applies, to the first electrodes 81 in the regions LD, the one or more potentials (such as the three different potentials of FRP, FRP2, and FRP3) based on the number of gradations of the light transmittance. Then, the control circuit 90*a* turns OFF the TFTs. After the TFTs are turned OFF, the potentials are held until the TFTs are turned ON next time. For example, in the third embodiment, potential holding circuits, such as capacitors, coupled to the first electrodes 81 are provided in each region LD, and hold the potentials. Subsequently, in the same manner also for the coordinates of y2, y3, and y4, the setting (updating) of the transmittance values of the dimming area DA is completed after the display output (updating) of the display segment regions PA is completed along the scanning direction. FIG. 19 illustrates the timing diagram in which the setting (updating) of the transmittance values of the dimming area DA is completed after the display output (updating) of the display segment regions PA corresponding to a coordinate of yj (where $1 \leq j \leq 3$) is completed, but before the display output (updating) of the display segment regions PA corresponding to a coordinate of y(j+1) is completed. In FIG. 19, the scanning is performed in the order of y1, y2, y3, and y4. The order may, however, be reversed, or may have another regularity, such as y4, y2, y3, and y1.

According to the third embodiment, the number of the sequential circuits of the shift register 91 included in the control circuit 90*a* and the number of the holding circuits included in the SRAM 92 can be reduced, thus facilitating a reduction in circuit scale of the control circuit 90*a*.

The position of the dimming panel 80 is not limited to a position between the image display panel 30 and the light source device 50. The position of the dimming panel 80 may be, for example, on a display surface side of the image display panel 30. The synchronizer 16, the image buffer 15, and the dimming buffer 13 may be omitted. In this case, the transmittance may not be exactly synchronized with the display output image, in some cases. However, this actually causes no problem because it is very difficult for a human to visually recognize an offset by approximately one frame. The fourth sub-pixel 49W may be omitted. In this case, the conversion is not performed.

Other operational advantages accruing from the aspects described in the embodiments herein that are obvious from the description herein, or that are appropriately conceivable by those skilled in the art will naturally be understood as accruing from the present invention.

What is claimed is:

1. A display device comprising:

a display panel including a display area provided with a plurality of pixels;

a backlight configured to illuminate the display area of the display panel from a back surface thereof; and a dimmer configured to adjust a light quantity output from the backlight through the display area, the dimmer including a dimming panel and a dimming control circuit configured to control transmittance of light, wherein the dimming panel includes:

a dimmer array substrate having an upper surface side and a lower surface side;

a dimmer opposed substrate having a lower side that faces the upper surface side of the dimmer array substrate; and a dimming area that is disposed in a position overlapping the display area when the display area is viewed in a plan view, and that is provided so as to be variable in the transmittance, the dimming area including:

a plurality of regions arranged as a matrix having a plurality of rows and a plurality of columns covering the entire dimming area, each one of the plurality of regions including a first dimmer electrode, such that a plurality of the first dimmer electrodes are arranged in the matrix on the upper surface side of the dimmer array substrate, and a second dimmer electrode provided in a position facing the plurality of the first dimmer electrodes across a liquid crystal layer, the second dimmer electrode having a flat film-like structure that is disposed on the lower side of the opposed dimmer substrate and provided across the entire dimming area including each of the plurality of rows and the plurality of columns, such that the second dimmer electrode opposes each of the plurality of regions, wherein the dimming control circuit includes:

a shift register configured to receive an electrical signal for controlling a potential of each of the first dimmer electrodes and including a plurality of sequential circuits coupled in series;

a holding circuit to which an output of each of the sequential circuits is coupled; and a gradation voltage setter to which an output of the holding circuit is coupled, wherein each of the first dimmer electrodes is coupled to an output of the gradation voltage setter, wherein the dimmer has only a single shift register corresponding to the first dimmer electrodes that are arranged in the matrix on the upper surface side of the dimmer array substrate, and wherein the single shift register includes the sequential circuits disposed corresponding in number to the first dimmer electrodes that face the second dimmer electrode having the flat film-like structure.

2. The display device according to claim 1, wherein the shift register is configured to sequentially receive the electrical signal corresponding to a gradation level of each of the regions.

3. The display device according to claim 1, wherein the holding circuit comprises holding circuits corresponding in number to the first dimmer electrodes, wherein the output of each of the sequential circuits included in the shift register is coupled to an input of a corresponding one of the holding circuits included in the holding circuit, and wherein an output of each of the holding circuits included in the holding circuit corresponds to one of the first dimmer electrodes.

4. The display device according to claim 3, wherein the transmittance has three or more gradations set within a transmittance range including the minimum transmittance and the maximum transmittance, wherein two or more such sequential circuits are provided for each one of the first dimmer electrodes, and wherein the electrical signal is a signal representing any one of the three or more gradations.

5. The display device according to claim 4, further comprising a corrector configured to correct a signal to be output to the display panel according to the transmittance.

6. The display device according to claim 5, wherein the display area includes a plurality of display segment regions corresponding to positions of the respective regions, wherein the corrector is configured to perform correction to correct a gradation value of each of the pixels included in each of the display segment regions according to the transmittance of a corresponding one of the regions, and wherein the correction is a process to multiply the gradation value by the reciprocal of the transmittance on a basis that the minimum transmittance is 0 and the maximum transmittance is 1.

7. The display device according to claim 1, wherein electrical signals applied to the first dimmer electrodes and the second electrode are inverted in polarity at a predetermined period.

8. The display device according to claim 1, wherein the dimming panel is located between the display panel and the backlight.

9. The display device according to claim 1, wherein the backlight comprises a side light located on a lateral side of the display area when the display area is viewed in the plan view.

10. The display device according to claim 1, wherein a plurality of first wires are arranged in a first direction and coupled to the dimming control circuit, and each of the first dimmer electrodes is connected to the dimming control circuit through a corresponding first wire extending in a second direction crossing the first direction.

11. The display device according to claim 1, wherein each of the gradation voltage setters includes a plurality of switches, and each of the first dimmer electrodes is coupled to a corresponding switch through a wire.

12. The display device according to claim 1, wherein the holding circuit comprises a plurality holding circuits, wherein the gradation voltage setter comprises a plurality of switches and logic circuits, wherein the single shift register further includes:

the holding circuits disposed corresponding in number to the first dimmer electrodes;

the switches disposed corresponding in number to the first dimmer electrodes; and the logic circuits that are disposed corresponding in number to the first dimmer electrodes, the first dimmer electrodes facing the second dimmer electrode having the flat film-like structure.

13. The display device according to claim 1, wherein the display panel is a polymer-dispersed liquid crystal comprises:

a liquid crystal layer including bulk formed of a polymer and a plurality of fine particles dispersed in the bulk, the fine particles being made of liquid crystals;

a plurality of pixel electrodes;

a common electrode; and a translucent substrate disposed on a side opposite to a display surface, wherein an orientation of the liquid crystals contained in the fine particles is controlled by a voltage difference between each of the pixel electrodes and the common electrode, wherein the dimmer is provided on a side of the translucent substrate and adjusts the transmittance of light on the first translucent substrate side, and wherein a portion of a display output image is highlighted by making regions corresponding to the portion in the dimmer darker than the regions corresponding to portions other than the portion.

14. A display device comprising:

a dimming control circuit configured to control transmittance of light; and a dimming panel including:

a dimmer array substrate having an upper surface side and a lower surface side;

a dimmer opposed substrate having a lower side that faces the upper surface side of the dimmer array substrate; and a dimming area provided so as to be variable in the transmittance, the dimming area including:

a plurality of regions arranged as a matrix having a plurality of rows and a plurality of columns covering the entire dimming area, each one of the plurality of regions including a first dimmer electrode, such that a plurality of the first dimmer electrodes are arranged in the matrix on the upper surface side of the dimmer array substrate, and a second dimmer electrode provided in a position facing plurality of the first dimmer electrodes across a liquid crystal layer, the second dimmer electrode having a flat film-like structure that is disposed on the lower side of the opposed dimmer substrate and provided across the entire dimming area including each of the plurality of rows and the plurality of columns, such that the second dimmer electrode opposes each of the plurality of regions, wherein the dimming control circuit includes:

a shift register configured to receive an electrical signal for controlling a potential of each of the first dimmer electrodes;

a holding circuit configured to hold the electrical signal output from the shift register until a time to control the potential; and a gradation voltage setter to which an output of the holding circuit is coupled, wherein each of the first dimmer electrodes is coupled to an output of the gradation voltage setter, wherein the dimmer has only a single shift register corresponding to the first dimmer electrodes that are arranged in the matrix on the upper surface side of the dimmer array substrate, and wherein the single shift register includes the sequential circuits disposed corresponding in number to the first dimmer electrodes that face the second dimmer electrode having the flat film-like structure.

15. A dimming device comprising:

a display panel including a display area provided with a plurality of pixels;

a backlight configured to illuminate the display area of the display panel from a back surface thereof; and a dimmer configured to adjust a light quantity output from the backlight through the display area, the dimmer including a dimming panel and a dimming control circuit configured to control transmittance of light, wherein the dimming panel includes:

a dimmer array substrate having an upper surface side and a lower surface side;

a dimmer opposed substrate having a lower side that faces the upper surface side of the dimmer array substrate; and a dimming area that is disposed in a position overlapping the display area when the display area is viewed in a plan view, and that is provided so as to be variable in the transmittance the dimming area including:

a plurality of regions arranged as a matrix having a plurality of rows and a plurality of columns covering the entire dimming area, each one of the plurality of regions including a first dimmer electrode, such that a plurality of the first dimmer electrodes are arranged in the matrix on the upper surface side of the dimmer array substrate, and a second dimmer electrode provided in a position facing the plurality of the first dimmer electrodes across a liquid crystal layer, the second dimmer electrode having a flat film-like structure that is disposed on the lower side of the opposed dimmer substrate and provided across the entire dimming area including each of the plurality of rows and the plurality of columns, such that the second dimmer electrode opposes each of the plurality of regions, wherein the dimming control circuit includes:

a shift register configured to receive an electrical signal for controlling a potential of each of the first dimmer electrodes and including a plurality of sequential circuits coupled in series;

a holding circuit to which an output of each of the sequential circuits is coupled; and a gradation voltage setter to which an output of the holding circuit is coupled, wherein each of the first dimmer electrodes is coupled to an output of the gradation voltage setter, wherein the dimmer has only a single shift register corresponding to the first dimmer electrodes that are arranged in the matrix on the upper surface side of the dimmer array substrate, and wherein the single shift register includes the sequential circuits disposed corresponding in number to the first dimmer electrodes that face the second dimmer electrode having the flat film-like structure.

16. A dimming device comprising:

a dimming control circuit configured to control transmittance of light and a dimming panel including:

a dimmer array substrate having an upper surface side and a lower surface side;

a dimmer opposed substrate having a lower side that faces the upper surface side of the dimmer array substrate; and a dimming area provided so as to be variable in the transmittance, the dimming area including:

a plurality of regions arranged as a matrix having a plurality of rows and a plurality of columns covering the entire dimming area, each one of the plurality of regions including a first dimmer electrode, such that a plurality of the first dimmer electrodes are arranged in the matrix on the upper surface side of the dimmer array substrate, and a second dimmer electrode provided in a position facing plurality of the first dimmer electrodes across a liquid crystal layer, the second dimmer electrode having a flat film-like structure that is disposed on the lower side of the opposed dimmer substrate and provided across the entire dimming area including each of the plurality of rows and the plurality of columns, such that the second dimmer electrode opposes each of the plurality of regions, wherein the dimming control circuit includes:

a shift register configured to receive an electrical signal for controlling a potential of each of the first dimmer electrodes; and a holding circuit configured to hold the electrical signal output from the shift register until a time to control the potential; and a gradation voltage setter to which an output of the holding circuit is coupled, wherein each of the first dimmer electrodes is coupled to an output of the gradation voltage setter, wherein the dimmer has only a single shift register corresponding to the first dimmer electrodes that are arranged in the matrix on the upper surface side of the dimmer array substrate, and wherein the single shift register includes the sequential circuits disposed corresponding in number to the first dimmer electrodes that face the second dimmer electrode having the flat film-like structure.

* * * * *